(12) United States Patent
Furuno et al.

(10) Patent No.: US 7,441,965 B2
(45) Date of Patent: Oct. 28, 2008

(54) CONNECTOR

(75) Inventors: Yasuhiko Furuno, Shinagawa (JP);
Osamu Daikuhara, Shinagawa (JP);
Noboru Shimizu, Shinagawa (JP);
Toshihiro Kusagaya, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 399 days.

(21) Appl. No.: 11/299,626

(22) Filed: Dec. 13, 2005

(65) Prior Publication Data

US 2006/0274997 A1 Dec. 7, 2006

(30) Foreign Application Priority Data

Mar. 28, 2005 (JP) ............................ 2005-092974
Aug. 19, 2005 (JP) ............................ 2005-238513

(51) Int. Cl.
*G02B 6/36* (2006.01)
*G02B 6/26* (2006.01)
*G02B 6/42* (2006.01)

(52) U.S. Cl. ............................ 385/93; 385/15; 385/31; 385/32; 385/33; 385/39; 385/88; 385/89; 385/92

(58) Field of Classification Search ................... 385/89, 385/93
See application file for complete search history.

(56) References Cited

U.S. PATENT DOCUMENTS

| | | | |
|---|---|---|---|
| 5,631,988 A * | 5/1997 | Swirhun et al. ............... | 385/89 |
| 6,312,167 B1 * | 11/2001 | Kim et al. ...................... | 385/89 |
| 6,318,909 B1 * | 11/2001 | Giboney et al. ............... | 385/90 |
| 6,374,004 B1 * | 4/2002 | Han et al. ...................... | 385/14 |
| 6,404,960 B1 * | 6/2002 | Hibbs-Brenner et al. ...... | 385/52 |
| 6,522,798 B2 * | 2/2003 | Chiappetta et al. ............ | 385/14 |
| 6,530,700 B2 * | 3/2003 | Williams ....................... | 385/92 |
| 6,729,771 B2 * | 5/2004 | Kim et al. ...................... | 385/76 |
| 6,736,553 B1 * | 5/2004 | Stiehl et al. .................... | 385/89 |
| 6,901,185 B2 * | 5/2005 | Sasaki et al. ................... | 385/33 |
| 6,934,450 B2 * | 8/2005 | Hiramatsu ..................... | 385/52 |
| 6,955,480 B2 * | 10/2005 | Gallup et al. .................. | 385/88 |
| 7,329,054 B1 * | 2/2008 | Epitaux et al. ................. | 385/89 |
| 2003/0138223 A1* | 7/2003 | Sasaki et al. ................... | 385/93 |
| 2004/0120659 A1* | 6/2004 | Cheng et al. ................... | 385/89 |
| 2007/0183724 A1* | 8/2007 | Sato ............................. | 385/89 |

* cited by examiner

*Primary Examiner*—Frank G Font
*Assistant Examiner*—Ryan Lepisto
(74) *Attorney, Agent, or Firm*—Staas & Halsey LLP

(57) ABSTRACT

A connector is disclosed that includes a housing and a module assembly disposed inside the housing. The module assembly includes a semiconductor element, a light receiving element, a light emitting element, a positioning plate in which a positioning hole is formed, a three-dimensional optical path component mounted on the positioning plate, and a printed circuit board on which the semiconductor element and the positioning plate are mounted. The three-dimensional optical path component includes a positioning pin and a projection. The light receiving element and the light emitting element are mounted on the positioning plate. The three-dimensional optical path component is positioned such that the positioning pin of the three-dimensional optical path component is fitted in the positioning hole formed in the positioning plate and the projection of the three-dimensional optical path component abuts an upper face of the positioning plate.

10 Claims, 21 Drawing Sheets

FIG.3
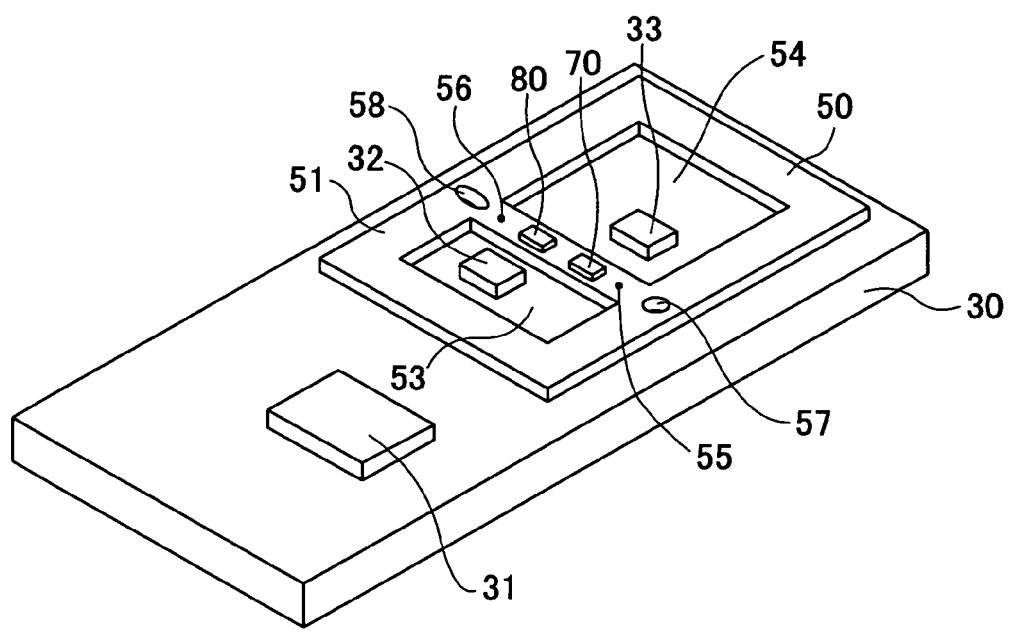
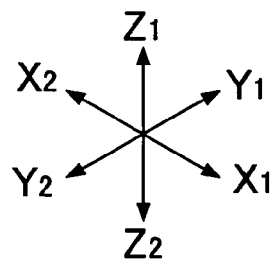

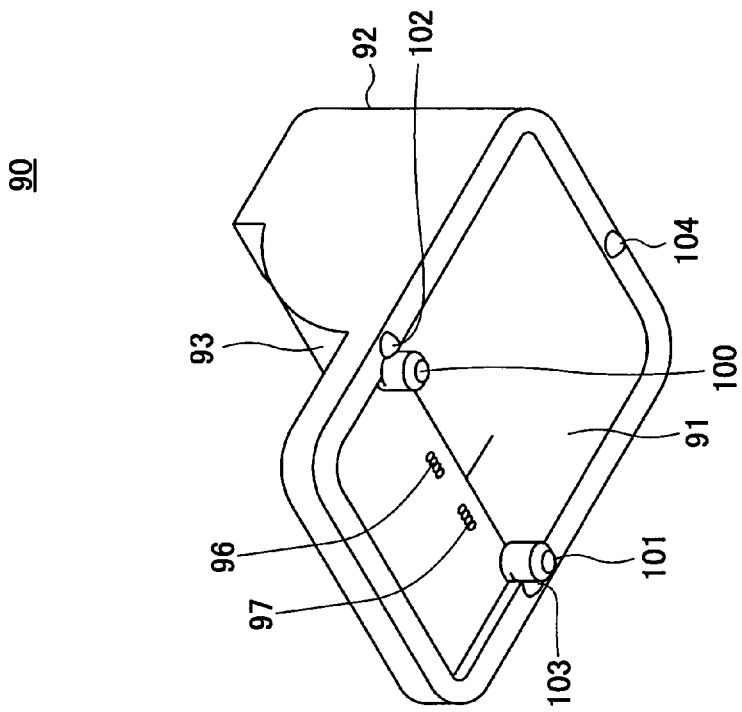
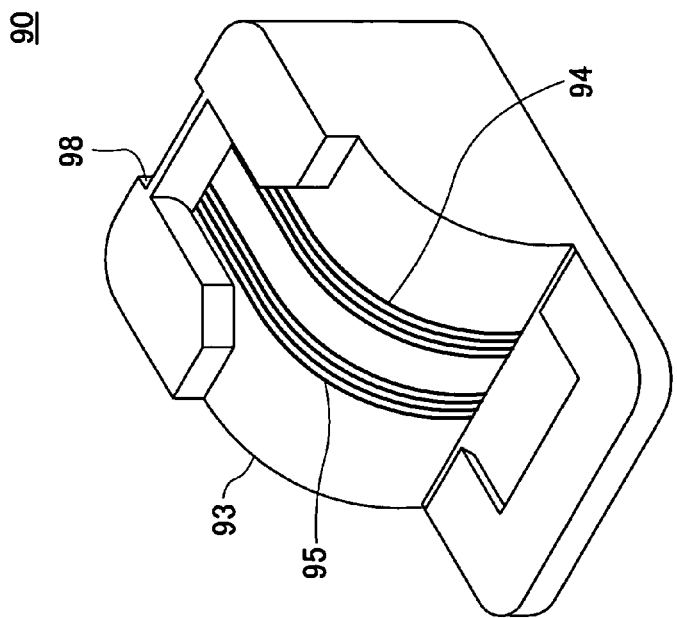

FIG.16A
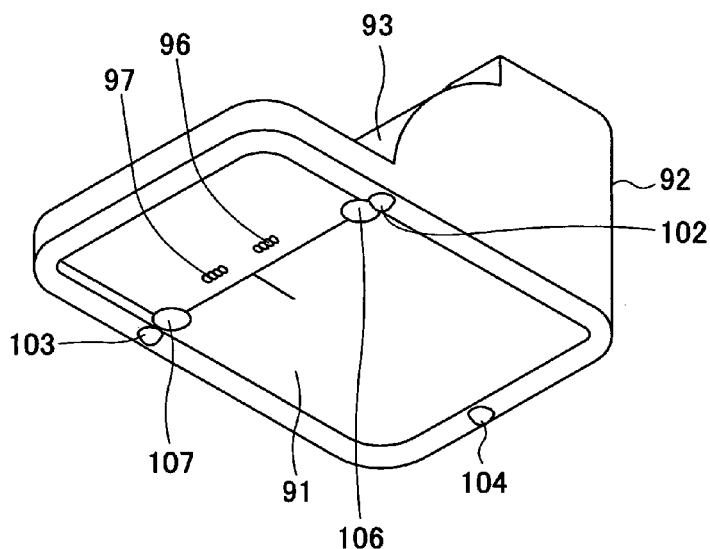
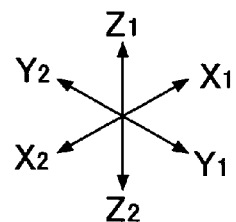
FIG.16B
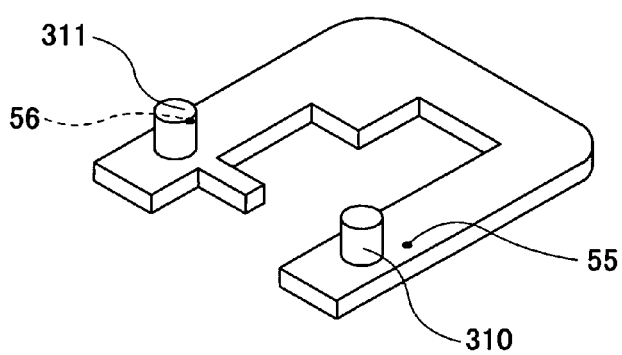
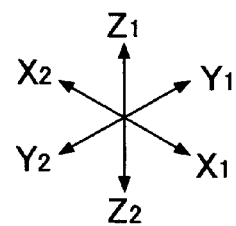

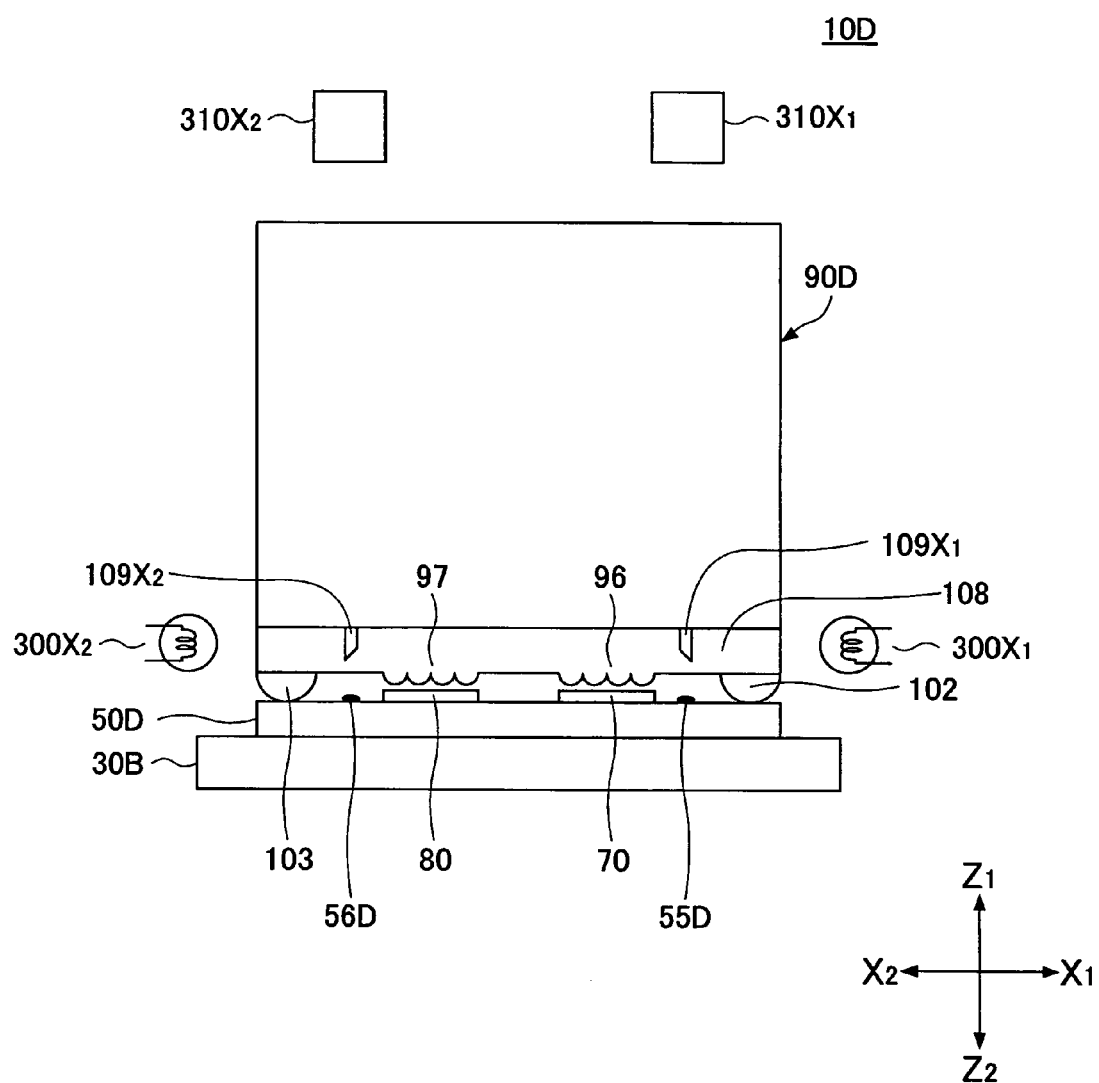

CONNECTOR

BACKGROUND OF THE INVENTION

1. Field of the Invention

The present invention generally relates to a connector, and particularly relates to a connector comprising a three-dimensional optical path component and capable of performing photoelectric conversion.

2. Description of the Related Art

Cable connectors comprising light emitting elements, light receiving elements, and three-dimensional (3D) optical path components have been known in the art. In a cable connector of this type, light emitting elements, light receiving elements, and a 3D optical path component are mounted on a printed circuit board, and an optical fiber cable extending from the rear side of the connector is fixed to a connector housing with a clamp or the like.

A problem with such a connector wherein the light emitting elements, the light receiving elements, and the 3D optical path component are mounted on the printed circuit board is that it is difficult to accurately position the 3D optical path component relative to the light emitting elements and the light receiving elements during assembly.

Further, since the optical fiber cable is fixed to the connector housing with the pressure of the clamp or the like, the optical fiber cable might be subjected to a clamping force. Therefore, such a fixing structure is not preferable.

SUMMARY OF THE INVENTION

The present invention solves at least one problem described above.

According to an aspect of the present invention, there is provided a connector comprising a housing; a module assembly disposed inside the housing, including an electric connector unit to be connected to a counterpart device, a semiconductor element, a light receiving element, a light emitting element, a positioning plate in which a positioning hole is formed, and on an upper face of which a light receiving element mount section and a light emitting element mount section where the light receiving element and the light emitting element are mounted, respectively, are formed, a three-dimensional optical path component mounted on the positioning plate, including an optical path, and a positioning pin and a projection on a bottom face of the three-dimensional optical path component on which a lens section is formed, and a printed circuit board on which the electric connecter unit, the semiconductor element, and the positioning plate are mounted; and an optical fiber cable extending from a rear side of the housing; wherein the three-dimensional optical path component is positioned such that the positioning pin of the three-dimensional optical path component is fitted in the positioning hole formed in the positioning plate and the projection of the three-dimensional optical path component abuts the upper face of the positioning plate.

As described above, the positioning plate is mounted on the printed circuit board. The light receiving element and the light emitting element are mounted on the light receiving element mount section and the light emitting element mount section formed on the positioning plate, respectively. Further, the three-dimensional optical path component is positioned such that the positioning pin of the three-dimensional optical path component is fitted in the positioning hole formed in the positioning plate and the projection of the three-dimensional optical path component abuts the upper face of the positioning plate. Therefore, the lens section of the three-dimensional optical path component is accurately positioned in the X, Y, and Z directions relative to the light receiving element and the light emitting element.

BRIEF DESCRIPTION OF THE DRAWINGS

FIG. 3 is a perspective view illustrating a printed circuit board assembly;

FIGS. 4A and 4B are perspective views illustrating a three-dimensional (3D) optical path component;

FIG. 16A is a perspective view illustrating a 3D optical path component;

FIG. 16B is a perspective view illustrating a positioning plate;

FIG. 21 is a schematic view illustrating a 3D optical path component positioned in place.

DETAILED DESCRIPTION OF THE PREFERRED EMBODIMENT

The following description provides exemplary embodiments of the present invention with reference to the accompanying drawings.

First Embodiment

Figure 1:
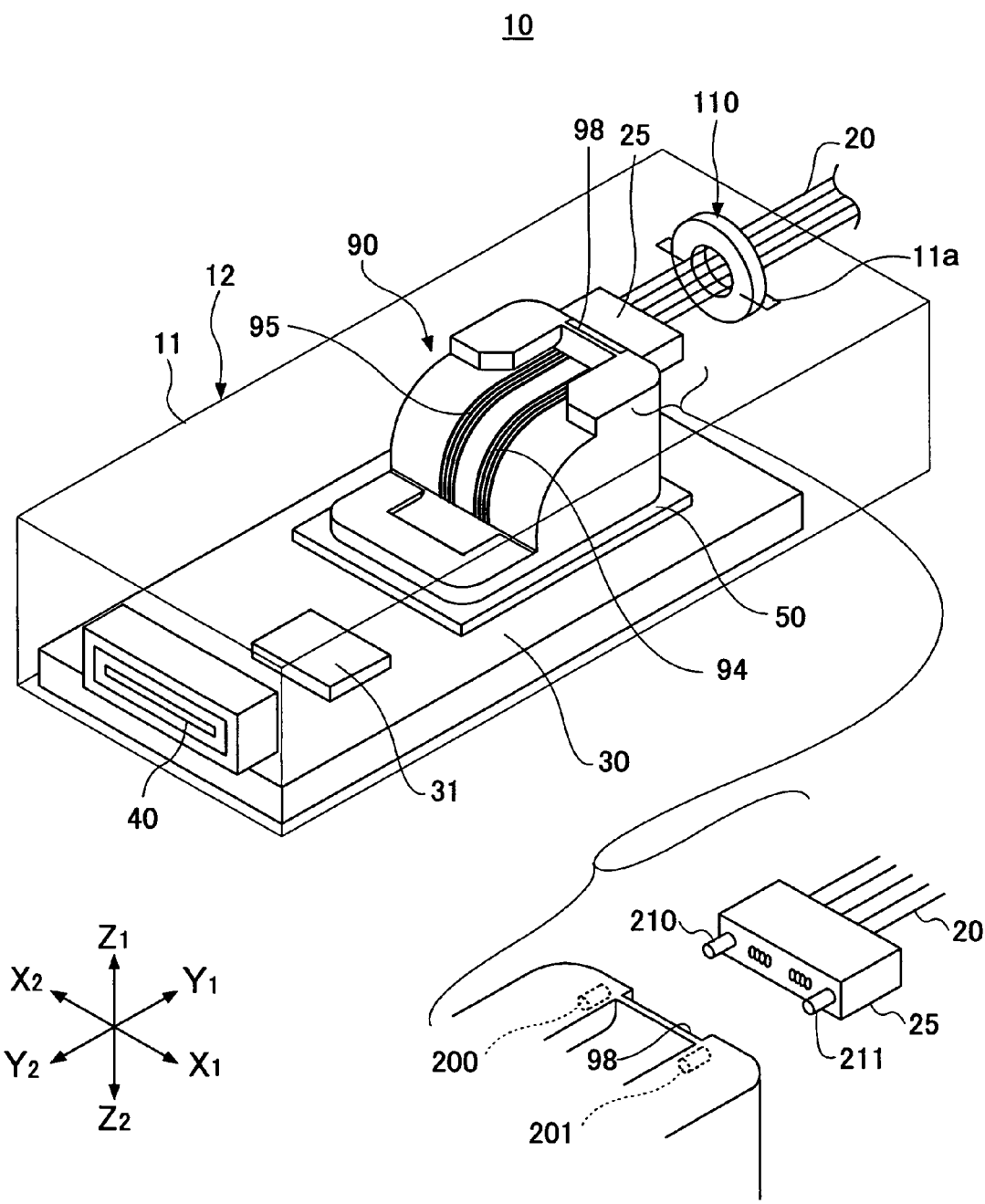
FIG. 1 is a perspective view illustrating a connector including a housing according to a first embodiment of the present invention.
Figure 2:
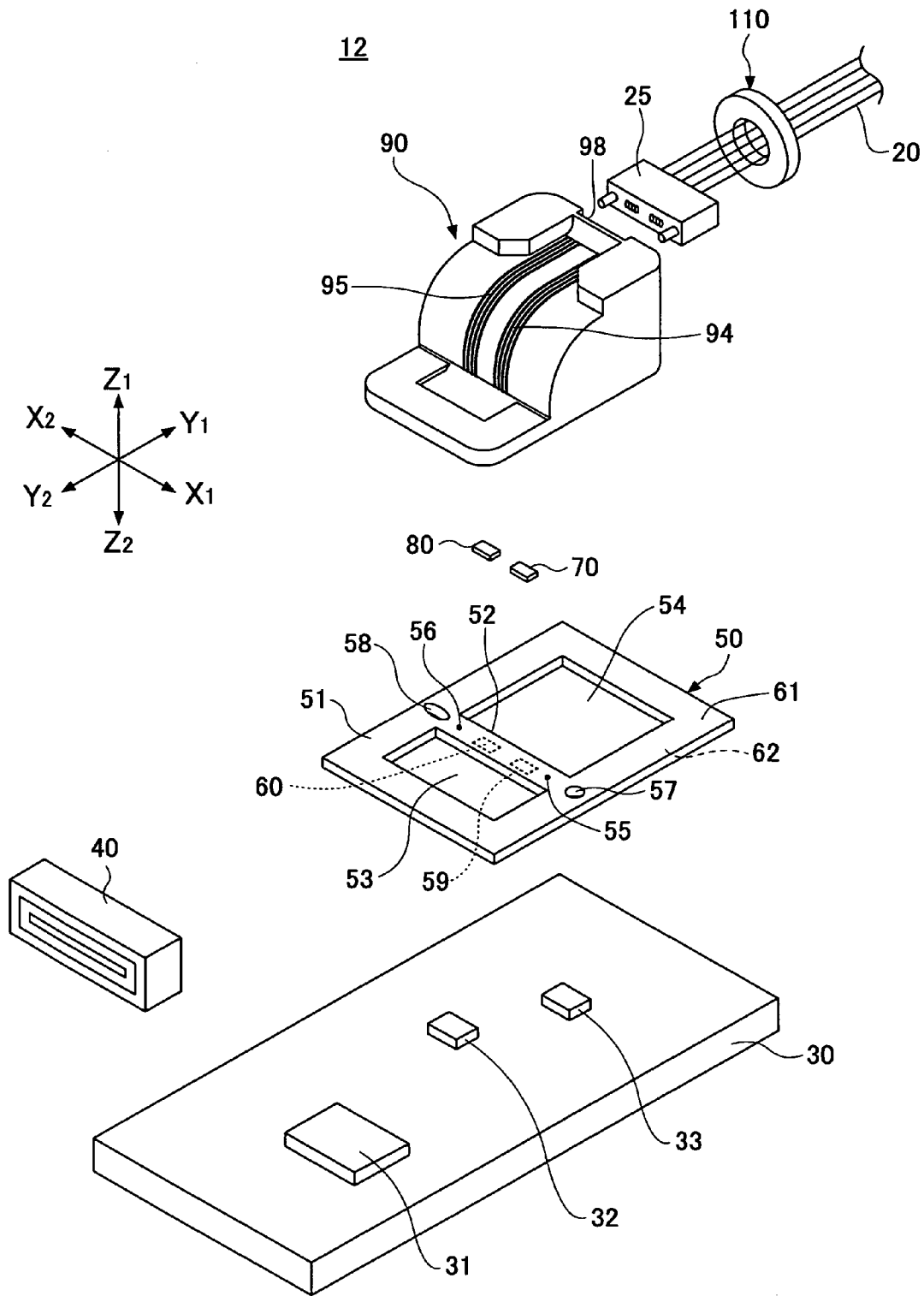
FIG. 2 is an exploded perspective view illustrating a module assembly disposed inside the housing of FIG. 1.

FIG. 1 is a perspective view illustrating a connector 10 including a housing 11 according to a first embodiment of the present invention. FIG. 2 is an exploded perspective view illustrating a module assembly 12 disposed inside the housing 11. FIG. 3 is a perspective view illustrating a printed circuit board assembly 15. In FIGS. 1-3, X1-X2 represents a width direction of the connector 10, Y1-Y2 represents a depth direction of the connector 10 (the directions of inserting and removing the connector 10), and Z1-Z2 represents a height direction of the connector 10. This representation of directions is equally applied to all the drawings illustrating embodiments of the present invention. Further, Y1 represents the rear side, and Y2 represents the front side. This representation of directions is equally applied to all the drawings illustrating embodiments of the present invention.

The connector 10 is capable of performing photoelectric conversion, and comprises the housing 11 from the front side of which an electric connector unit 40 is exposed, the module assembly 12 disposed inside the housing 11, and an optical fiber cable 20 extending from the rear side of the housing 11.

The module assembly 12 comprises the electric connector unit 40, a three-dimensional (3D) optical path component 90, and the printed circuit board assembly 15 (FIG. 3) on which the electric connector unit 40 and the 3D optical path component 90 are mounted.

Referring to FIGS. 2 and 3, the printed circuit board assembly 15 comprises semiconductor elements, i.e., a microcontroller package 31, a light emitting element driver package 32, and an amplifier package 33, a positioning plate 50, and a printed circuit board 30 on which the semiconductor elements 31-33 and the positioning plate 50 are mounted. The printed circuit board assembly 15 further comprises a light receiving (PD) element 70 and a light emitting element (VCSEL) 80. The electric connector unit 40 is mounted on the Y2 side of the printed circuit board 30 as shown in FIG. 1.

With reference to FIG. 2, the positioning plate 50 has a size and shape corresponding to a bottom surface of the 3D optical path component 90. The positioning plate 50 comprises a frame 51 having a rectangular shape, a bridge 52 extending across the frame 51 in the X direction, and two windows 53 and 54 defined by the frame 51 and the bridge 52. A first alignment mark 55 and a second alignment mark 56 are formed on the X1 side end and the X2 side end of the bridge 52, respectively. A positioning hole 57 having a circular shape and a positioning hole 58 elongated in the X direction are formed at the X1 side of the first alignment mark 55 and the X2 side of the second alignment mark 56, respectively. Further, a light receiving element mount section 59 and a light emitting element mount section 60 are formed on the bridge 52.

The positioning plate 50 is made of a material that can be shaped with high accuracy, such as silicon and metal, and is formed highly accurately with use of photolithography techniques, pressing, or injection molding. An upper face 61 and a lower face 62 of the positioning plate 50 are finished flat. The positioning hole 57 and the light receiving element mount section 59 are formed accurately with reference to the first alignment mark 55, while the positioning hole 58 and the light emitting element mount section 60 are formed accurately with reference to the second alignment mark 56.

Referring to FIG. 3, the positioning plate 50 is arranged such that the light emitting element driver package 32 is positioned within the window 53 and the amplifier package 33 is positioned within the window 54. In this configuration, because the wiring between the light receiving element 70 and the amplifier package 33, and the wiring between the light emitting element 80 and the light emitting element driver package 32 are relatively short, the responsiveness is improved. The positioning plate 50 is mounted by reflow or die bonding during the process of mounting the microcontroller package 31, the light emitting element driver package 32, and the amplifier package 33.

The light receiving element 70 is accurately positioned on the light receiving element mount section 59 with reference to the first alignment mark 55, while the light emitting element 80 is accurately positioned on the light emitting element mount section 60 with reference to the second alignment mark 56.

FIGS. 4A and 4B illustrate the 3D optical path component 90. The 3D optical path component 90, which is a synthetic resin molded product, comprises a bottom face 91, a rear face 92, and a curved face 93. A first waveguide array 94 and a second waveguide array 95 are formed on the curved face 93. A first lens array 96 including lenses corresponding to waveguides of the first waveguide arrays 94 is formed at an end of the first waveguide array 94 on the bottom face 91, while a second lens array 97 including lenses corresponding to waveguides of the second waveguide array 95 is formed at an end of the second waveguide array 95 on the bottom face 91. Lens arrays (not shown, see lens arrays denoted by reference number 99 in FIGS. 8A and 8B for reference) are formed also at the other ends of the first and second waveguide arrays 94 and 95 in a recess 98 formed in the rear face 92. Positioning holes 200 and 201 are formed one at each side of the recess 98. The recess 98 is formed in order to maintain a constant distance in the Y direction between the lens arrays formed at the ends of the first and second waveguide arrays 94 and 95 and a front face of an optical connector 25 (FIGS. 1 and 2) connected to the lens arrays.

The bottom face 91 is sized to correspond to the positioning plate 50. Referring to FIG. 4B, X/Y direction positioning bosses 100 and 101, and Z direction positioning projections 102, 103, and 104 are formed on the bottom face 91. Each of the X/Y direction positioning bosses 100 and 101 has a columnar shape. Each of the Z direction positioning projections 102, 103, and 104 has a hemispherical shape. The X/Y direction positioning bosses 100 and 101 are arranged to correspond to the positioning holes 57 and 58. The Z direction positioning projections 102, 103, and 104 are arranged on an X1 side peripheral edge, an X2 side peripheral edge, and a Y1 side peripheral edge, respectively, such that lines connecting the Z direction positioning projections 102, 103, and 104 form a generally triangular shape so as to prevent the 3D optical path component 90 from falling over or leaning. Since the 3D optical path component 90 is a synthetic resin molded product, the positions and diameters of the X/Y direction positioning bosses 100 and 101, the positions and heights H (FIG. 5) of the Z direction positioning projections 102, 103, and 104, and the positional relationships between the X/Y direction positioning bosses 100, 101 and the first and second lens arrays 96, 97 are accurate.

The 3D optical path component 90 is mounted on the positioning plate 50 such that the X/Y direction positioning bosses 100 and 101 are fitted in the positioning holes 57 and 58, and the Z direction positioning projections 102, 103, and 104 abut the upper face 61 of the positioning plate 50 to support the 3D optical path component 90 at these three points.

The following describes the positional relationship between the light receiving element 70 and the first lens array 96, and the positional relationship between the light emitting element 80 and the second lens array 97.

The positioning accuracy in the X and Y directions is as follows. The light receiving element 70, the light emitting element 80, and the 3D optical path component 90 are fixed to the upper face 61 of the positioning plate 50. The light receiving element 70 and the light emitting element 80 are arranged on the mount sections 59 and 60 with reference to the alignment marks 55 and 56, respectively. The positions of the X/Y direction positioning bosses 100 and 101 relative to the first and second lens arrays 96 and 97 are accurate. The 3D optical path component 90 is therefore accurately positioned by fitting the X/Y direction positioning bosses 100 and 101 into the positioning holes 57 and 58, respectively. Accordingly, the first lens array 96 is accurately positioned over the light receiving element 70 to face the first lens array 96, and the second lens array 97 is accurately positioned over the light emitting element 80 to face the light emitting element 80.

Figure 5:
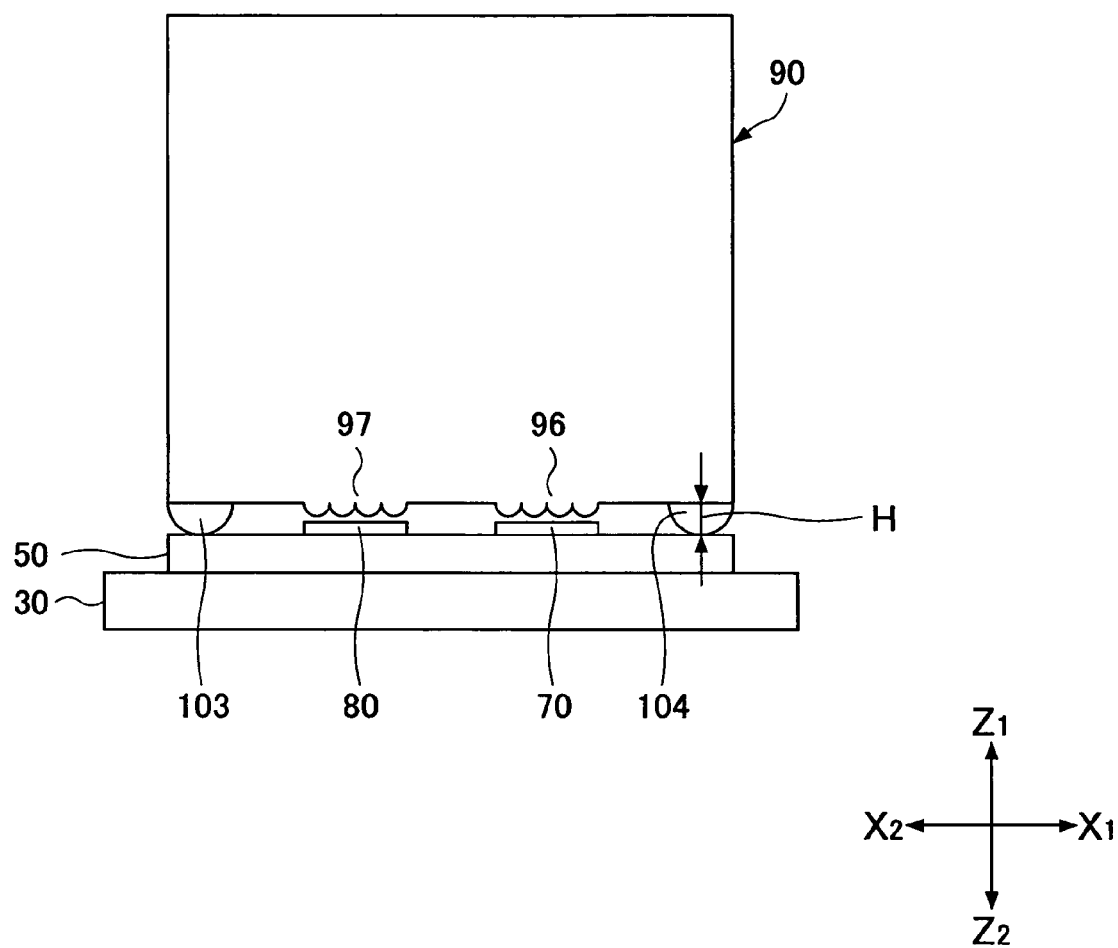
FIG. 5 is a schematic view illustrating a 3D optical path component positioned in place.

The positioning accuracy in the Z direction is as follows. Referring to FIG. 5, the Z direction positioning projections 102-104 are formed accurately to each have the height H. Since the positions of the light receiving element 70, the light emitting element 80, and the 3D optical path component 90 in the Z direction are determined with reference to the upper face 61 of the positioning plate 50, the first and second lens arrays 96 and 97 are accurately positioned relative to the light receiving element 70 and the light emitting element 80 in the Z direction.

Referring back to FIGS. 1 and 2, the optical connector 25 is provided at the front end of the optical fiber cable 20, and a lock structure 110 is disposed near the optical connector 25. The optical connector 25 is positioned in the X and Z directions such that positioning pins 210 and 211 of the optical connector 25 are fitted in the positioning holes 200 and 201 and positioned in the Y direction such that a rear face of the optical connector 25 abuts the rear face 92 of the 3D optical path component 90. At this position, the optical connector 25 is connected at a front face thereof to the rear face 92 of the 3D optical path component 90. The distance (clearance) between the front face of the optical connector 25 and the lens arrays at the ends of the first and second waveguide arrays 94 and 95 corresponds to the Y-direction size of the recess 98. The lock structure 110 is fixed by being fitted in a recess 11a formed at the rear part of the housing 11. The optical connector 25 can be inserted and removed only by an operator so as to prevent damage from the laser.

The electric connector unit 40 is connected to an electric connector unit of a device (not shown) during use of the connector 10. The microcontroller package 31, the light emitting element driver package 32, the amplifier package 33, the light receiving element 70, and the light emitting element 80 receive power supplied from the device through an independent terminal of the electric connector unit 40. Optical signals transmitted through the optical fiber cable 20 pass through the optical connector 25, the first waveguide array 94, and the first lens array 96 to be incident on the light receiving element 70, where the optical signals are converted into electrical signals. The electrical signals are amplified by the amplifier package 33, and are transmitted through a wiring pattern formed on the printed circuit board 30 to the electric connector unit 40 and then to the device. On the other hand, electrical signals transmitted from the device pass through the electric connector unit 40, the wiring pattern formed on the printed circuit board 30, and the light emitting element driver package 32. The light emitting element driver package 32 drives the light emitting element 80 to convert the electrical signals into optical signals. The optical signals pass through the second lens array 97, the second waveguide array 95, and the optical connector 25 so as to be sent out through the optical fiber cable 20.

Figure 6A:
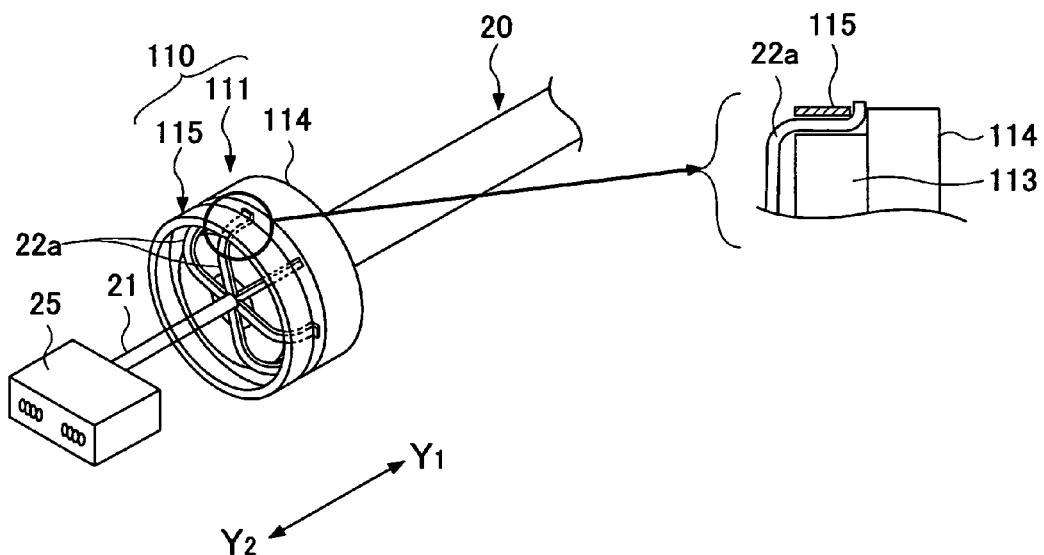
FIG. 6A is a perspective assembly view illustrating a lock structure provided at the end of an optical fiber.
Figure 6B:
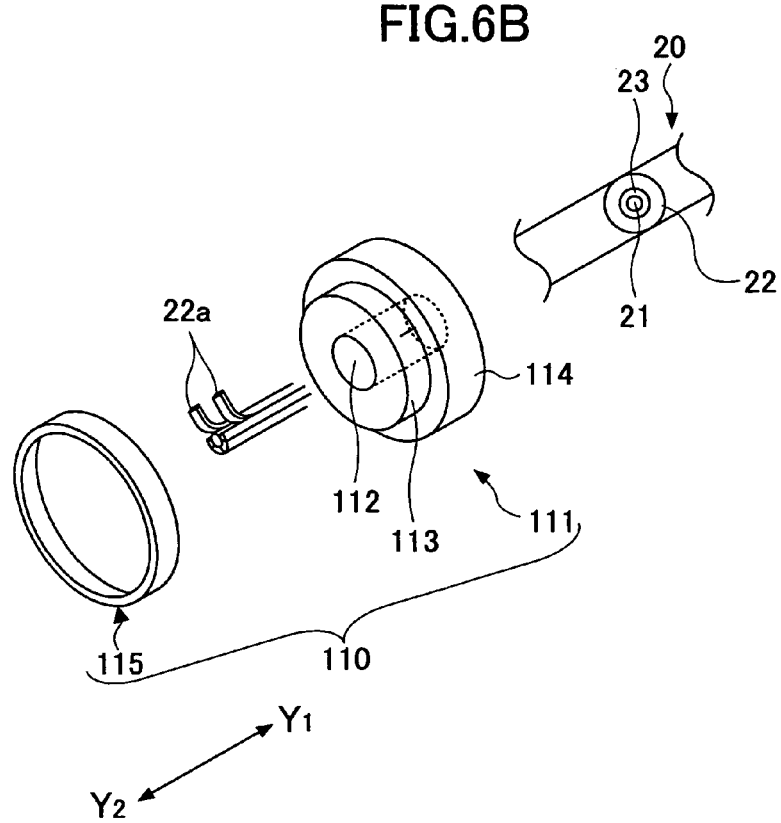
FIG. 6B is an exploded perspective view illustrating the lock structure of FIG. 6B.

The lock structure 110 is now described in detail with reference to FIGS. 6A and 6B.

The optical fiber cable 20 comprises an optical fiber core 21 in the center, an outer cladding 22, and a middle cladding 23 interposed between the optical fiber core 21 and the outer cladding 22.

The lock structure 110 comprises a first caulking member 111 and a second caulking member 115. The first caulking member 111 comprises an annular section 113 and a flange section 114, defining a center hole 112 through which the optical fiber cable 20 passes. The flange section 114 has a larger external diameter than the annular section 113. While the flange section 114 in the illustrated embodiments has a circular shape, the flange section 114 may have other shapes such as a rectangular shape.

The second caulking member 115 is a ring that is sized to be loosely fitted on the annular section 113.

An end of the optical fiber cable 20 is inserted into the center hole 112 from the Y1 side and extends out to the Y2 side. The outer cladding 22 of the optical fiber cable 20 extending out from the annular section 113 is longitudinally cut to be divided into, for example, six places, and the divided pieces 22a are opened radially outward. The second caulking member 115 is then fitted onto the annular section 113 from the Y2 side such that the ends of the radially-opened divided pieces 22a are interposed and held between the second caulking member 115 and the annular section 113 of the first caulking member 111. The first caulking member 111 and the second caulking member 115 of the lock structure 110 are fitted in the recess 11a formed at the rear part of the housing 11, and the movement of the lock structure is thus restricted. Accordingly, the first caulking member 111 is fixed and able to absorb a force that pulls the optical fiber cable 20 in the Y1 direction, thereby preventing the pulling force from being transmitted to the optical connector 25. The force for holding the ends of the radially-opened divided pieces 22a does not acts on the optical fiber cable 20 extending through the center hole 112, so that no stress is applied to the optical fiber core 21. Therefore, the propagation characteristics of optical signals within the optical fiber core 21 are not reduced. The movement of the lock structure 110 is restricted because the first and second caulking members 111 and 115 are fitted in the recess 11a formed at the rear part of the housing 11.

Figure 7:
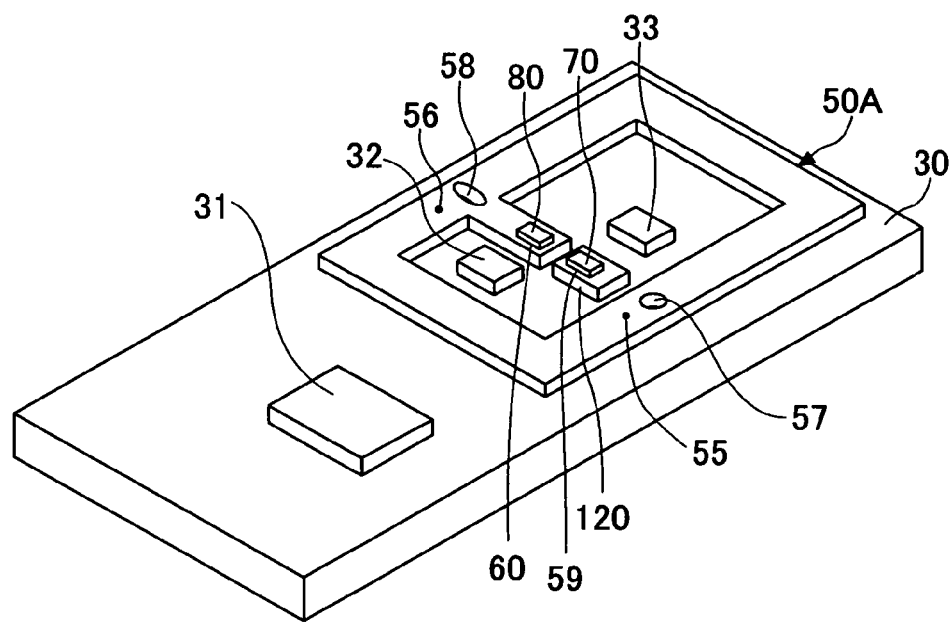
FIG. 7 is a perspective view illustrating a modified printed circuit board assembly.

FIG. 7 illustrates a modified printed circuit board assembly 15A. In addition to a positioning plate 50A, a positioning plate piece 120 is mounted on a printed circuit board 30. A light receiving element mount section 59 where a light receiving element 70 is mounted is formed on the positioning plate piece 120. A light emitting element 80 is mounted on a light emitting element mount section 60 formed on the positioning plate 50A.

With this configuration, the position of the second lens array 97 of the 3D optical path component 90 in the Z direction (i.e. height of the second lens array 97) relative to the light emitting element 80 can be adjusted in the case where the rear surface potential of light emitting element 80 is different from the rear surface potential of the light receiving element 70. Therefore, the position of the second lens array 97 of the 3D optical path component 90 in the Z direction (i.e. height of the second lens array 97) relative to the light emitting element 80 can be controlled more precisely than the position of the first lens array 96 of the 3D optical path component 90 in the Z direction (i.e. height of the first lens array 96) relative to the light receiving element 70.

Figure 8B:
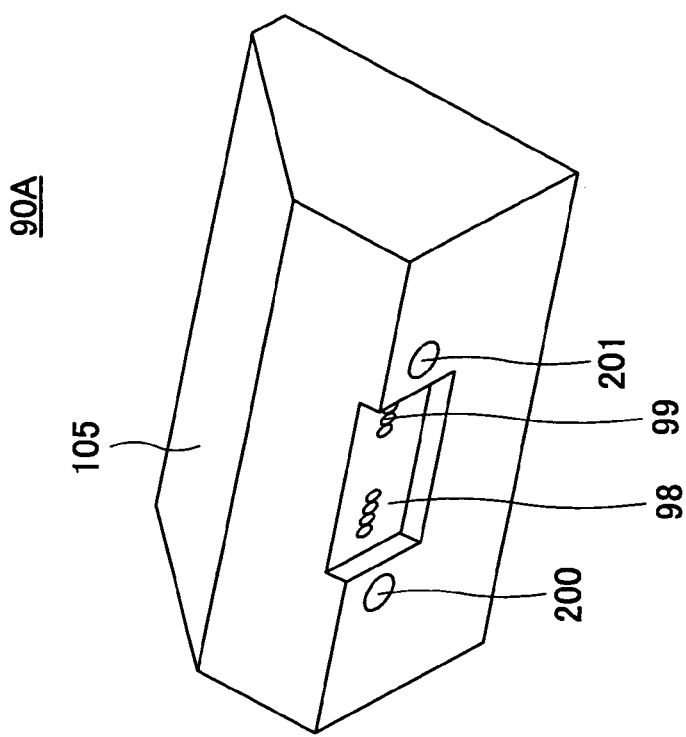
FIGS. 8A and 8B are perspective views illustrating a modified 3D optical path component.
Figure 8A:
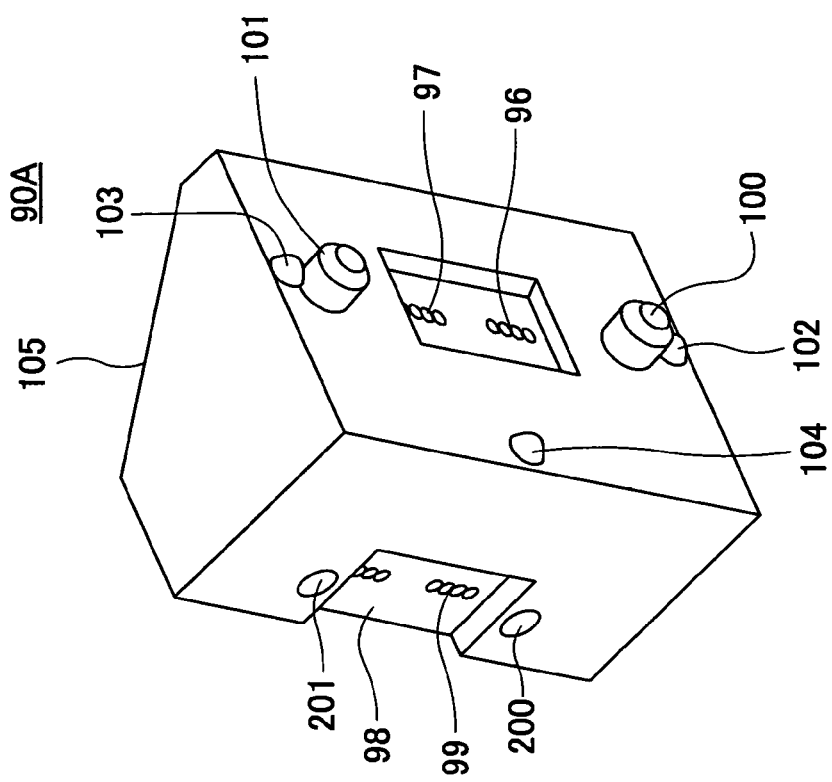

The above-described 3D optical path component 90 may be substituted for by a 3D optical path component 90A shown in FIGS. 8A and 8B. In FIGS. 8A and 8B, components identical to those in FIGS. 4A and 4B bear the same reference numerals. The 3D optical path component 90A includes a reflection mirror 105 for bending the optical path at a right angle in place of the first and second waveguide arrays 94 and 95. As with the 3D optical path component 90, this 3D optical path component 90A is also accurately positioned on the positioning plate 50 in the X, Y, and Z directions.

Second Embodiment

Figure 9:
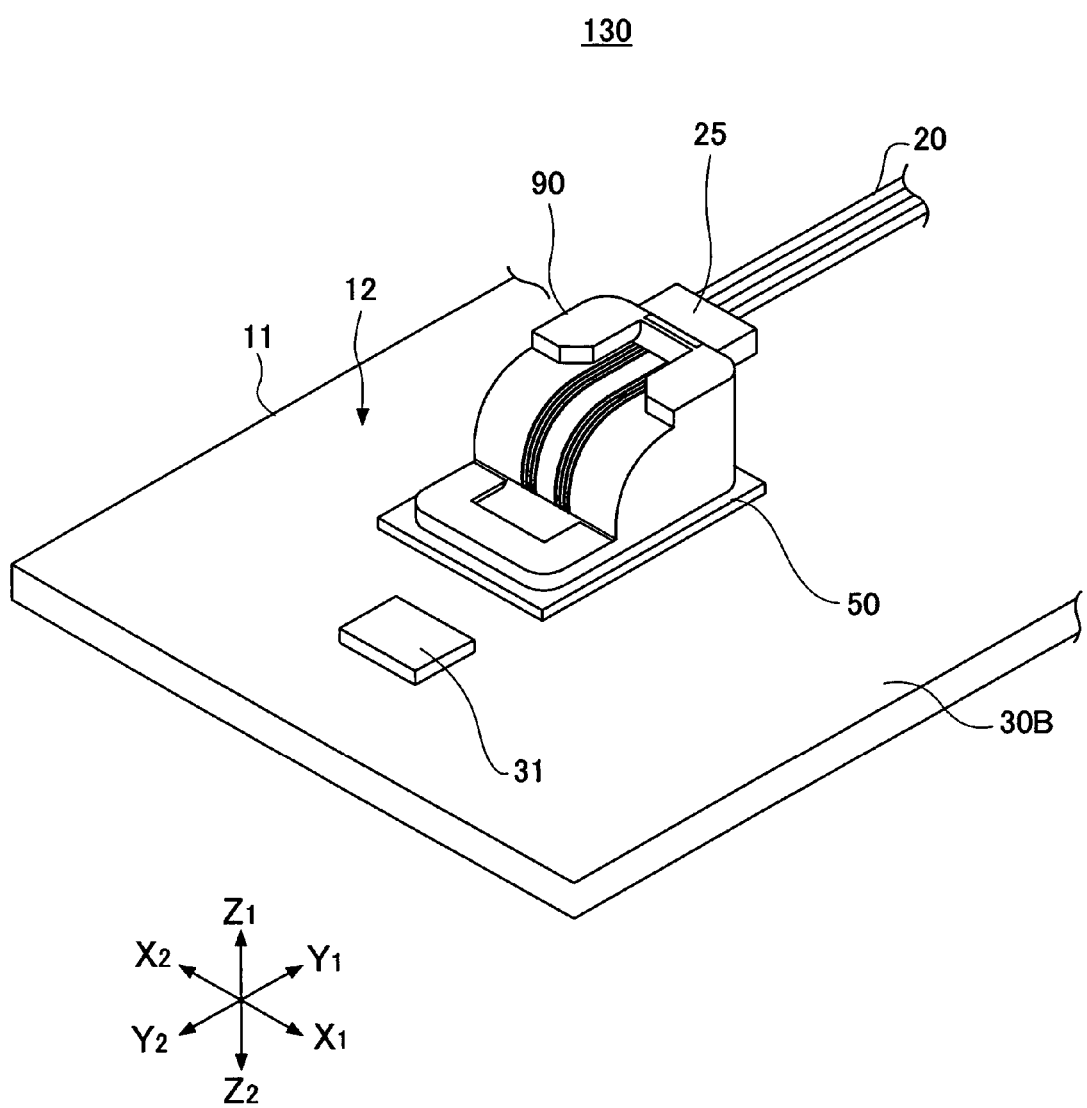
FIG. 9 is a perspective view illustrating a mount structure according to a second embodiment of the present invention.
Figure 10:
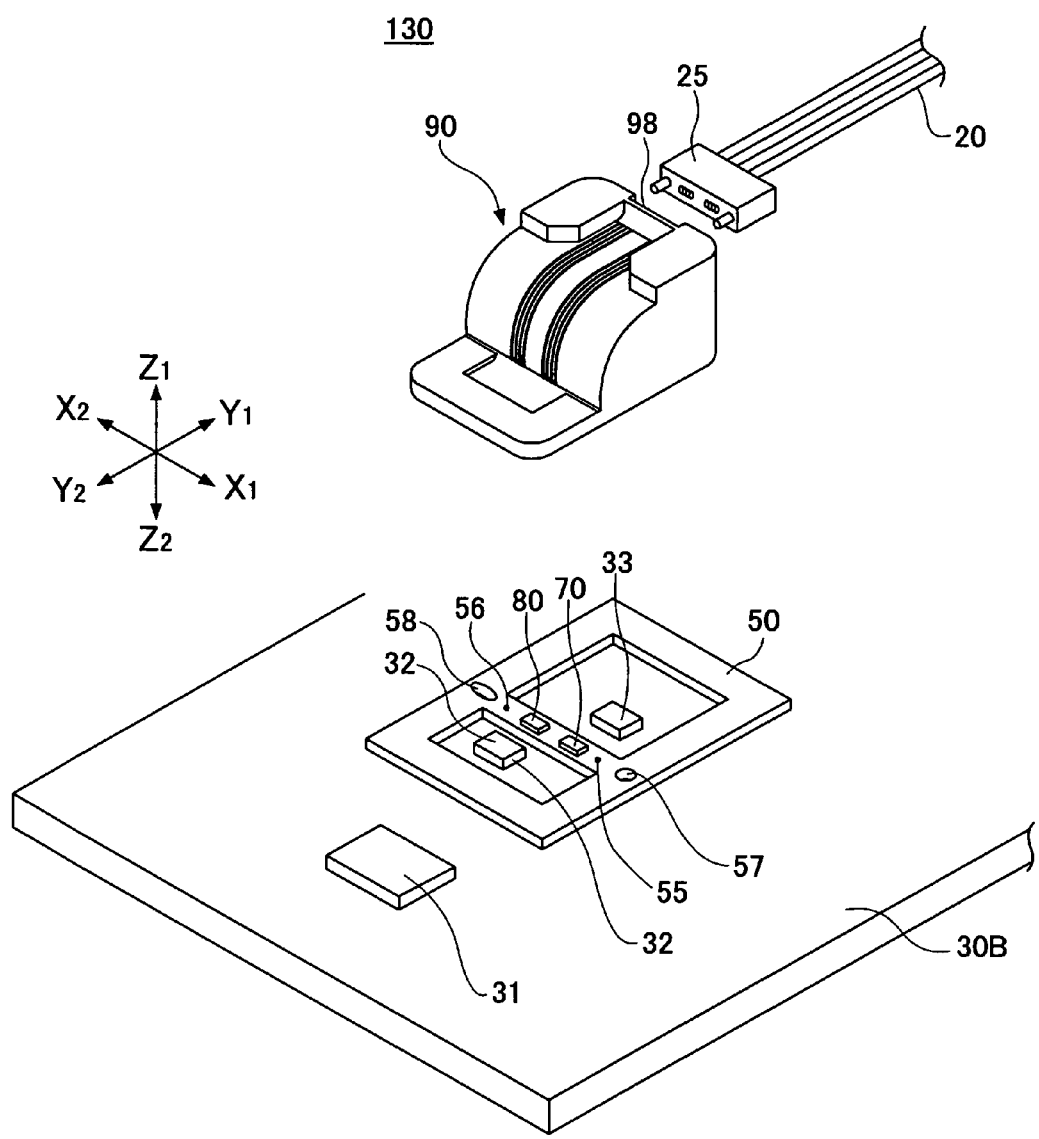
FIG. 10 is a perspective view illustrating the mount structure of FIG. 9 wherein a 3D optical path component is separated.
Figure 11:
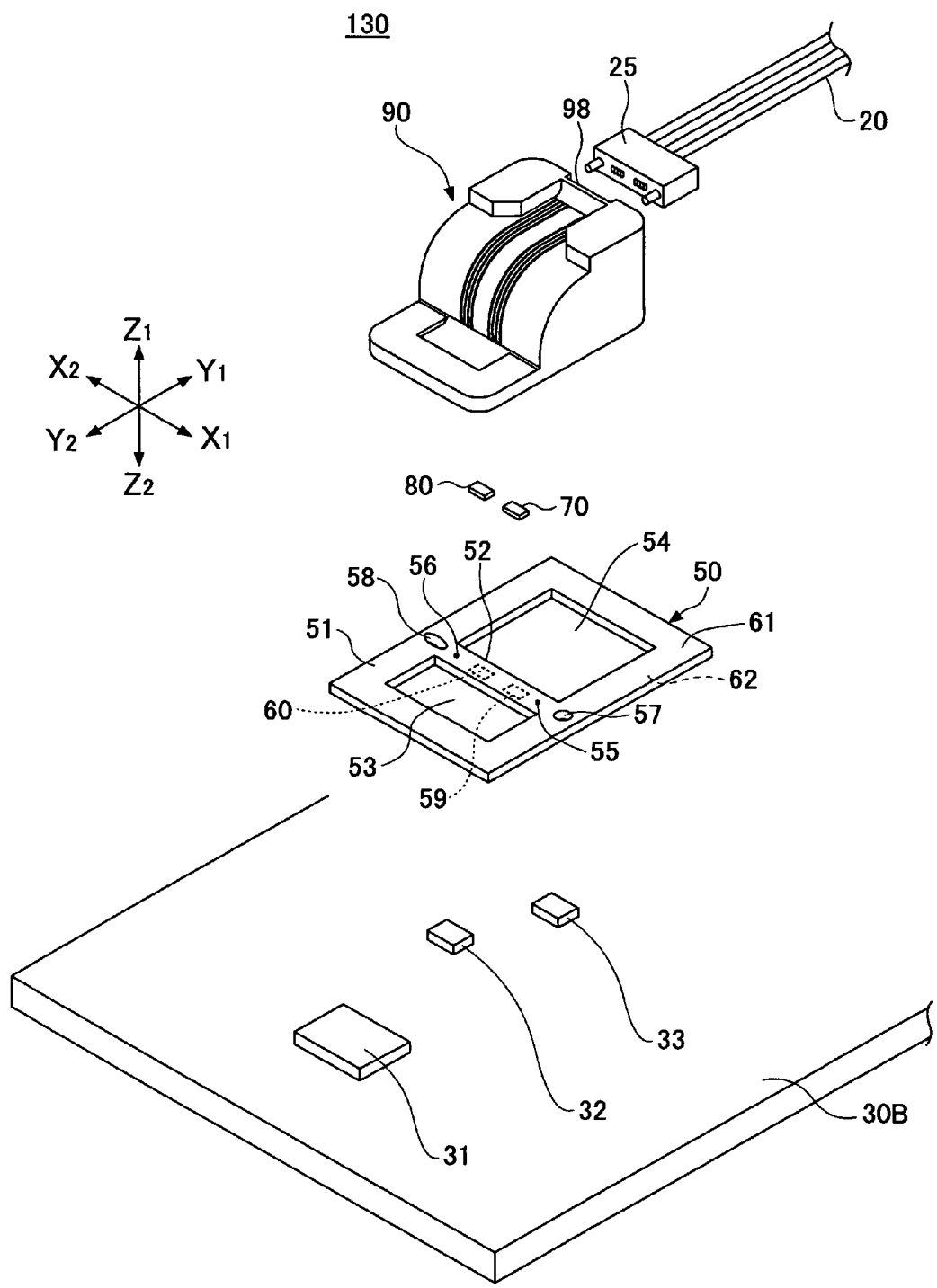
FIG. 11 is a perspective view illustrating the mount structure of FIG. 10 wherein a positioning plate is also separated.

FIG. 9 is a perspective view illustrating a mount structure 130 according to a second embodiment of the present invention. FIG. 10 is a perspective view illustrating the mount structure 130 of FIG. 9 wherein a 3D optical path component 90 is separated. FIG. 11 is a perspective view illustrating the mount structure 130 of FIG. 10 wherein a positioning plate 50 is also separated. In FIGS. 9-11, components identical to those in FIGS. 1-3 bear the same reference numerals.

A printed circuit board 30B is a large-size printed circuit board to be installed inside a device. Semiconductor elements, i.e., a microcontroller package 31, a light emitting element driver package 32, and an amplifier package 33, and a positioning plate 50 are mounted on the printed circuit board 30B. A light receiving element 70 and a light emitting element 80 are mounted on the positioning plate 50. As is the 3D optical path component 90 of the first embodiment, the 3D optical path component 90 of the second embodiment is also accurately positioned on the positioning plate 50 in the X, Y, and Z directions. An optical connector 25 provided at an end of an optical fiber cable 20 is connected to a recess 98 of the 3D optical path component 90.

Third Embodiment

Figure 12A:
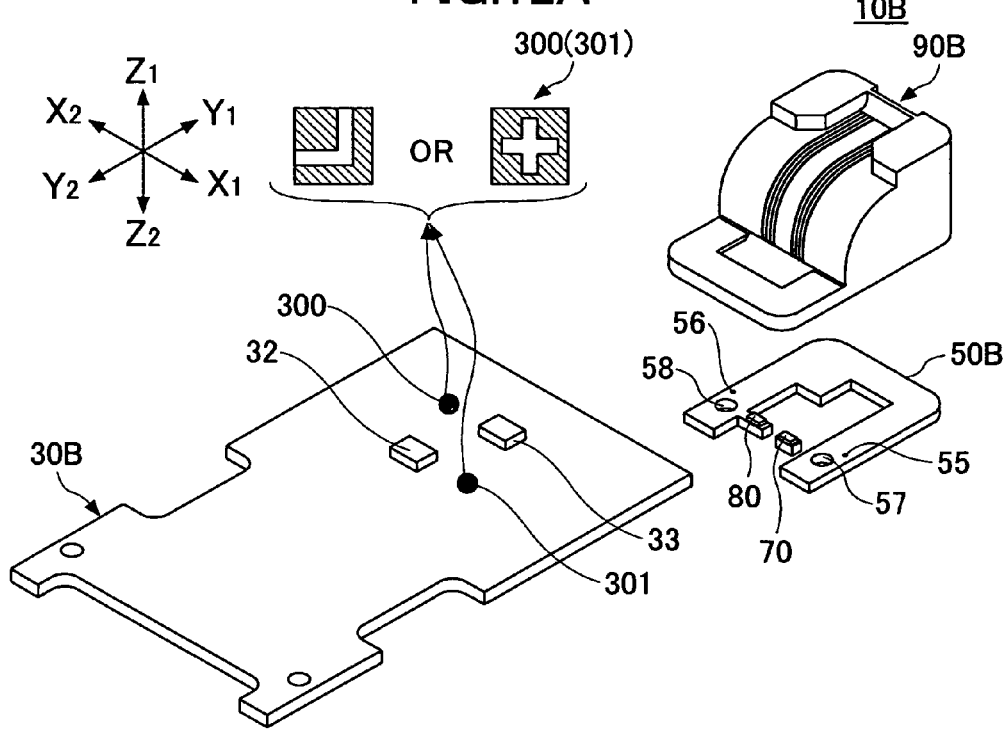
FIG. 12A is an exploded perspective view illustrating a connector according to a third embodiment of the present invention (housing and optical fiber cable not shown)
Figure 12B:
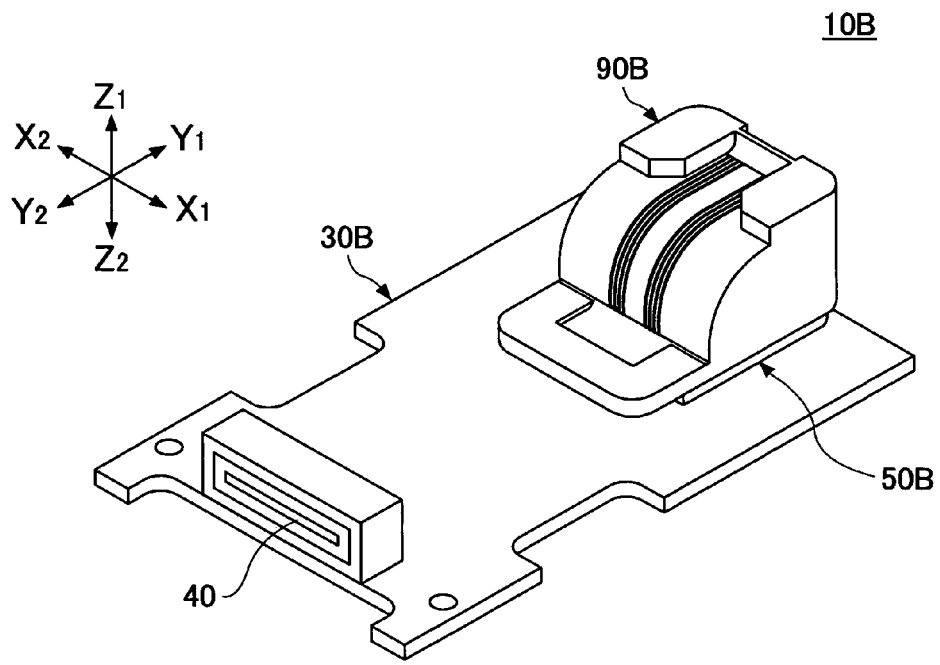
FIG. 12B is a perspective assembly view illustrating the connector of FIG. 12A (housing and optical fiber cable not shown)

FIGS. 12A and 12B illustrate a connector 10B according to a third embodiment of the present invention. Reference marks 300 and 301 each having a cross shape or an L shape are formed on a printed circuit board 30B. A light emitting element driver package 32 and an amplifier package 33 are positioned on the printed circuit board 30B with reference to the reference marks 300 and 301. Further, a positioning plate 50B is fixed to the printed circuit board 30B. A light receiving element 70 and a light emitting element 80 are mounted on the positioning plate 50B. Further, a 3D optical path component 90B is mounted on the positioning plate 50B.

It should be understood that, in FIGS. 12A and 12B, a housing and an optical fiber cable extending from the rear side of the housing are not shown for clarity.

Figure 13:
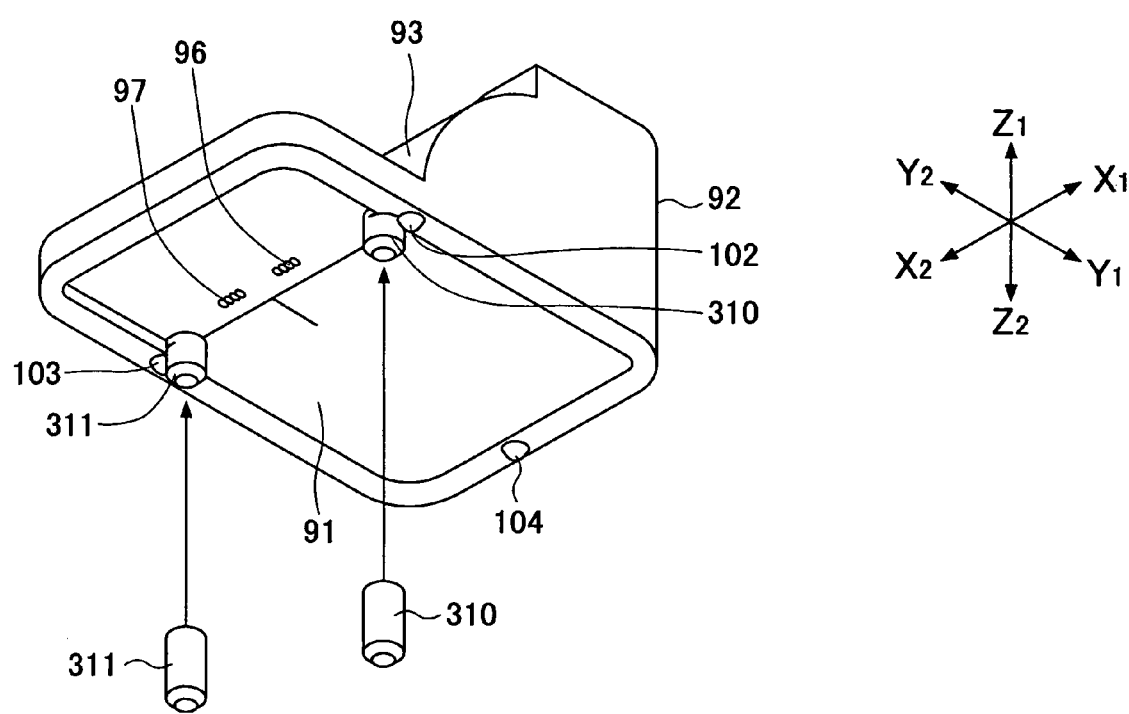
FIG. 13 is a bottom perspective view illustrating a 3D optical path component.
Figure 14:
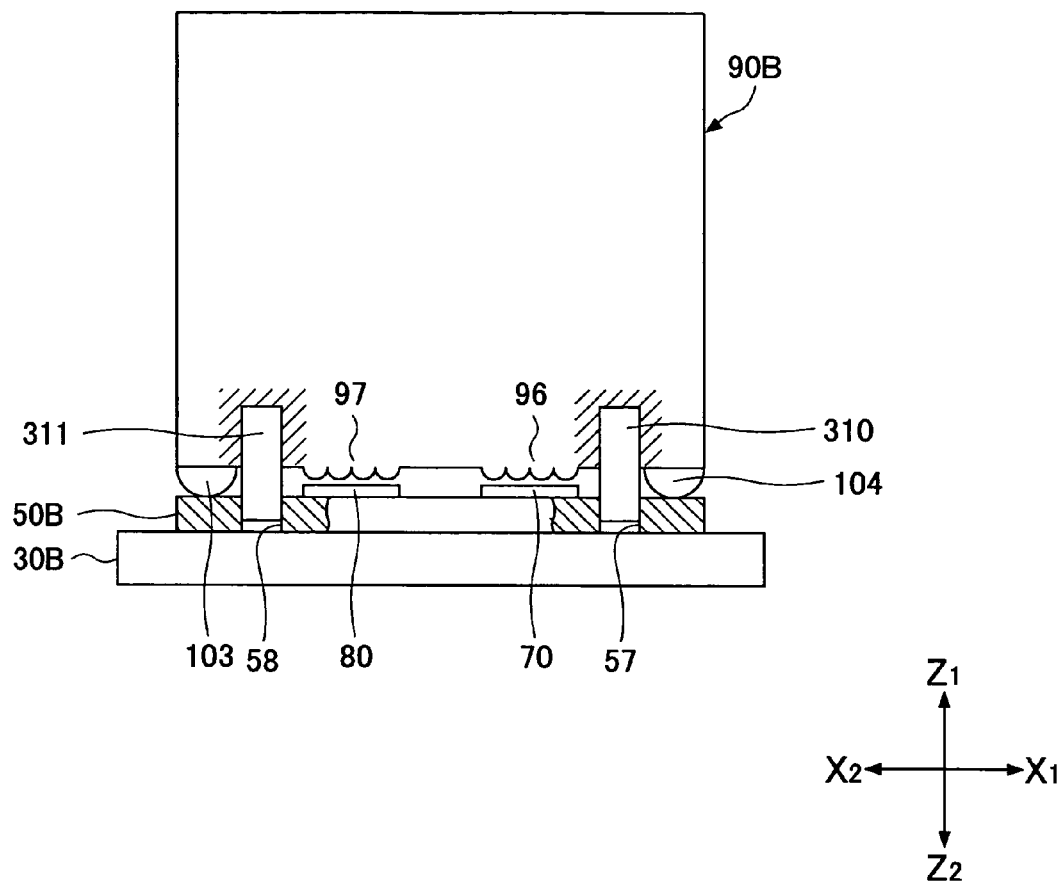
FIG. 14 is a schematic view illustrating a 3D optical path component positioned in place.

The 3D optical path component 90B of the third embodiment is different from the 3D optical path component 90 shown in FIGS. 4A and 4B in that X/Y direction positioning boss members 310 and 311 (see FIGS. 13 and 14) are provided in place of the X/Y direction positioning bosses 100 and 101 formed integrally with the 3D optical path component 90.

The X/Y direction positioning boss members 310 and 311 are metal parts each polished to have an accurate diameter. The X/Y direction positioning boss members 310 and 311 are integrated with the 3D optical path component 90B by insert molding.

The 3D optical path component 90B is positioned accurately by fitting the X/Y direction positioning boss members 310 and 311 into the positioning holes 57 and 58, respectively.

Since the X/Y direction positioning boss members 310 and 311 are polished metal parts, the accuracy of the diameters of the X/Y direction positioning boss members 310 and 311 can be higher than the accuracy of the diameters of the X/Y direction positioning bosses 100 and 101. The X/Y direction positioning boss members 310 and 311 are positioned as accurately as the X/Y direction positioning bosses 100 and 101. Therefore, the 3D optical path component 90B is positioned on the positioning plate 50B more accurately than the 3D optical path component 90 of the first embodiment, so that a first lens array 96 and a second lens array 97 accurately face the light receiving element 70 and the light emitting element 80, respectively.

The positioning plate 50B is a resin molded product with a coating.

Fourth Embodiment

Figure 15A:
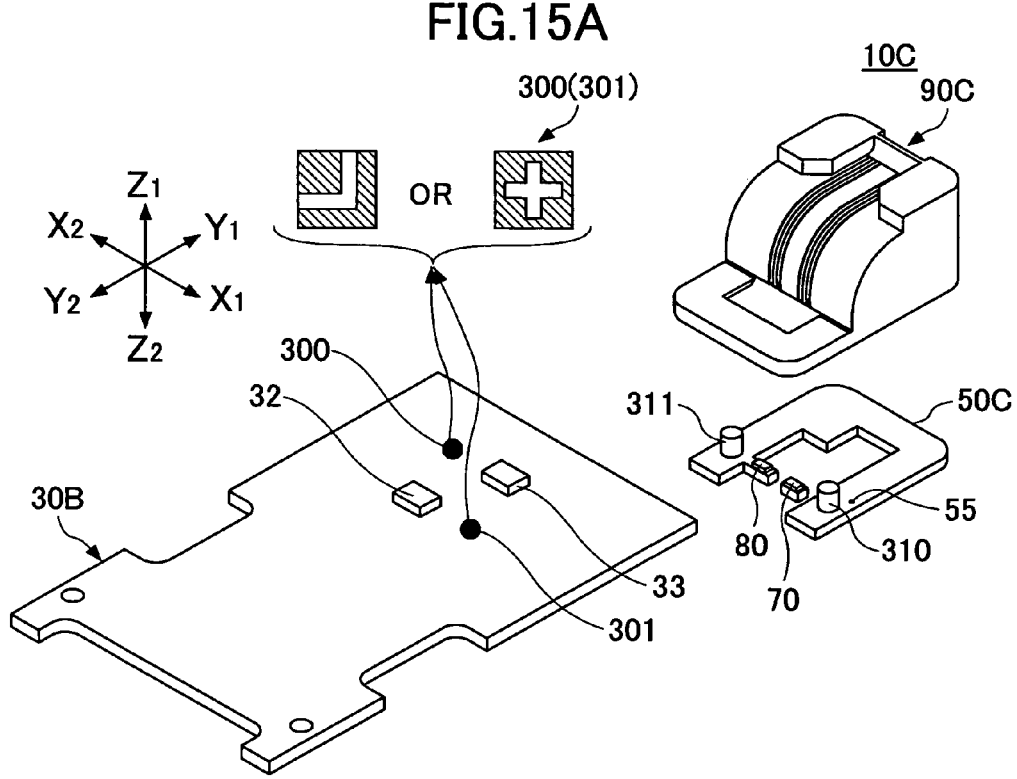
FIG. 15A is an exploded perspective view illustrating a connector according to a fourth embodiment of the present invention (housing and optical fiber cable not shown)
Figure 15B:
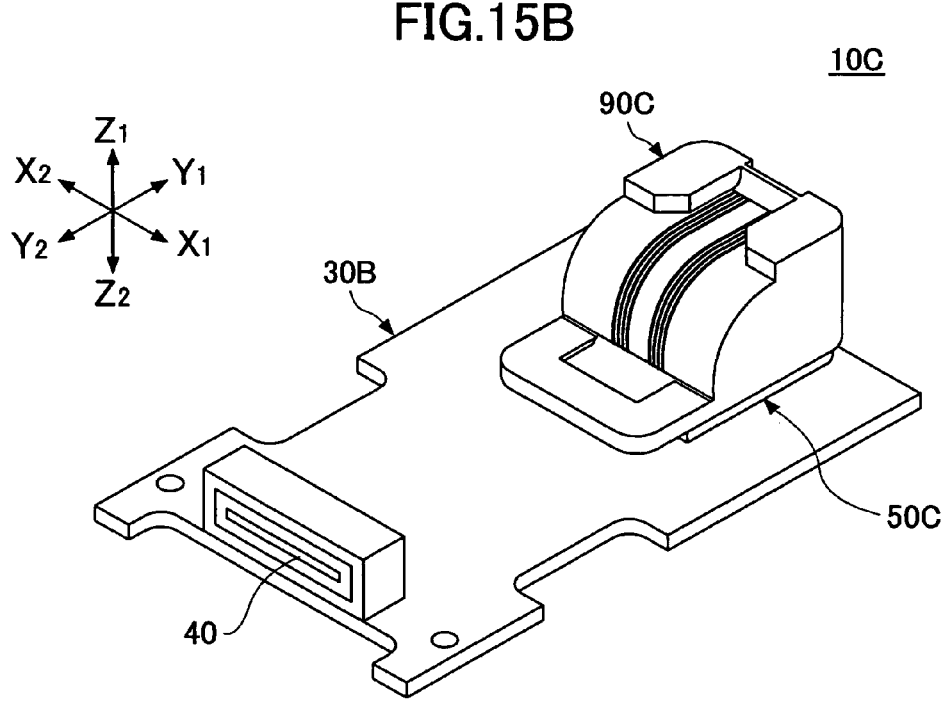
FIG. 15B is a perspective assembly view illustrating the connector of FIG. 15A (housing and optical fiber cable not shown)
Figure 17:
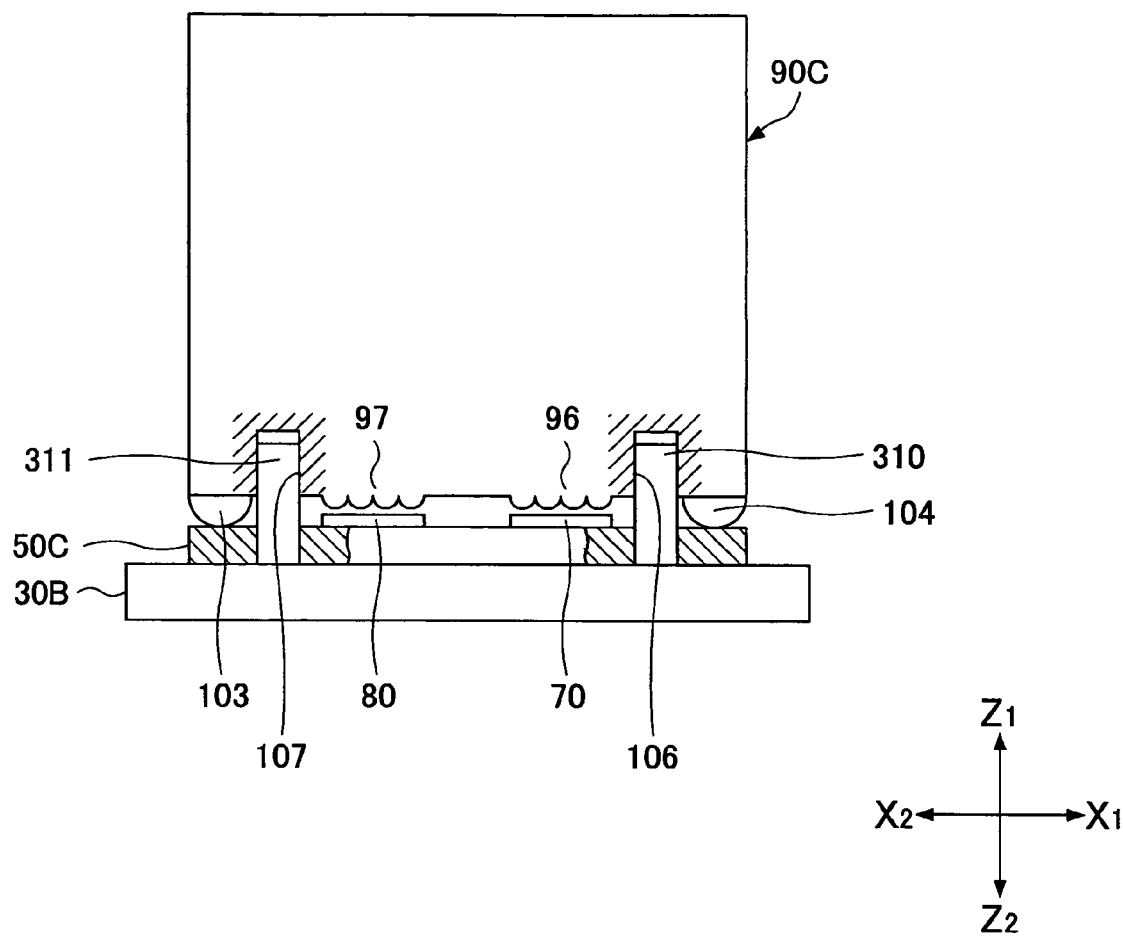
FIG. 17 is a schematic view illustrating a 3D optical path component positioned in place.

FIGS. 15A and 15B illustrate a connector 10C according to a fourth embodiment of the present invention. Referring to FIGS. 16A and 16B, in the connector 10C, X/Y direction positioning boss members 310 and 311 are fixed to a positioning plate 50C by insert molding, and positioning holes 106 and 107 are formed in a 3D optical path component 90C. Referring then to FIG. 17, the 3D optical path component 90C is positioned relative to the positioning plate 50C such that the X/Y direction positioning boss members 310 and 311 are fitted in the positioning holes 106 and 107, respectively. It should be understood that, in FIGS. 15A and 15B, a housing and an optical fiber cable extending from the rear side of the housing are not shown for clarity.

The X/Y direction positioning boss members 310 and 311 are polished metal parts, and therefore the accuracy of the diameters of the X/Y direction positioning boss members 310 and 311 can be higher than the accuracy of the diameters of the X/Y direction positioning bosses 100 and 101. The X/Y direction positioning boss members 310 and 311 are accurately positioned on the positioning plate 50C. Therefore, the 3D optical path component 90C is positioned on the positioning plate 50C more accurately than the 3D optical path component 90 of the first embodiment, so that a first lens array 96 and a second lens array 97 accurately face a light receiving element 70 and a light emitting element 80, respectively.

The positioning plate 50C is a resin molded product with a coating.

Fifth Embodiment

Figure 18A:
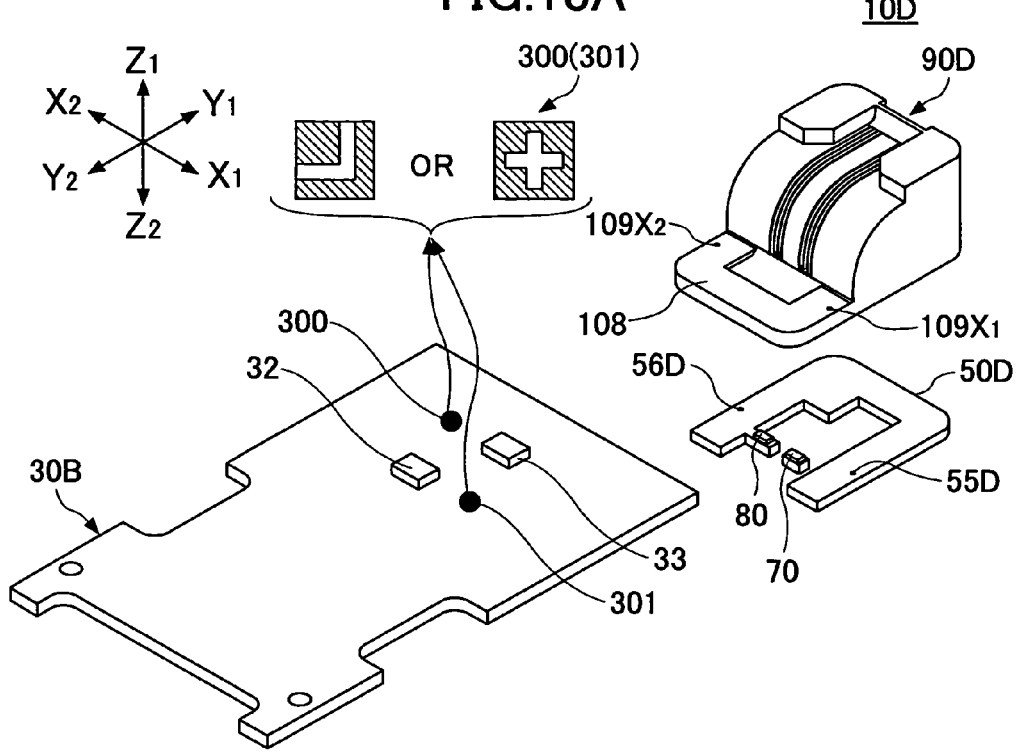
FIG. 18A is an exploded perspective view illustrating a connector according to a fifth embodiment of the present invention (housing and optical fiber cable not shown)
Figure 18B:
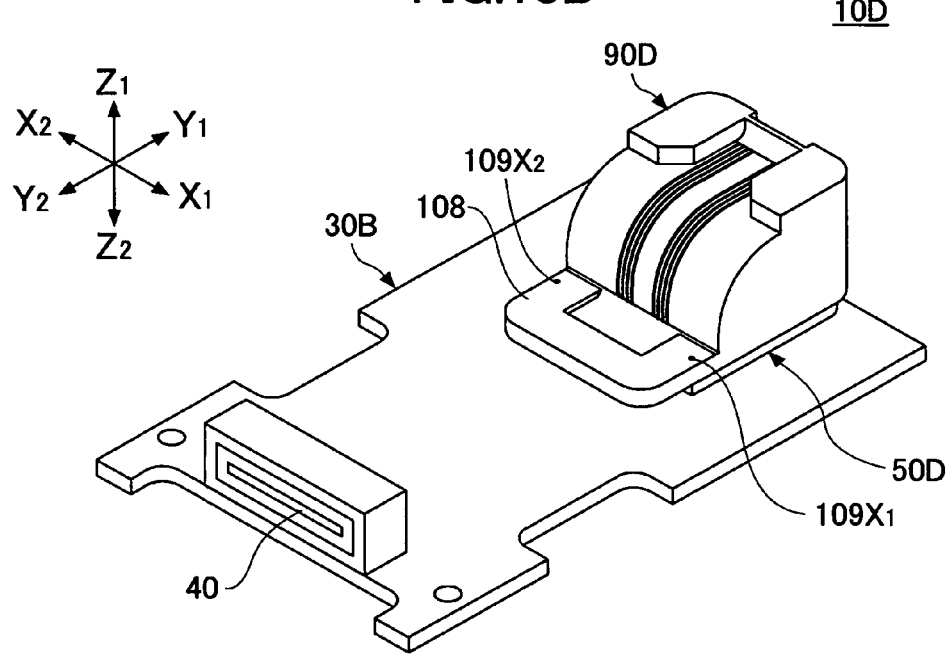
FIG. 18B is a perspective assembly view illustrating the connector of FIG. 18A (housing and optical fiber cable not shown)

FIGS. 18A and 18B illustrate a connector 10D according to a fifth embodiment of the present invention. In the connector 10D, a 3D optical path component 90D is positioned relative to a positioning plate 50D with use of first and second alignment marks 109X1 and 109X2. It should be understood that, in FIGS. 18A and 18B, a housing and an optical fiber cable extending from the rear side of the housing are not shown for clarity.

The 3D optical path component 90D is a transparent resin molded product, comprising an extended section 108 extending in the Y2 direction. The first and second alignment marks 109X1 and 109X2 are formed on the X1 side and the X2 side of the extended section 108, respectively.

Figure 19:
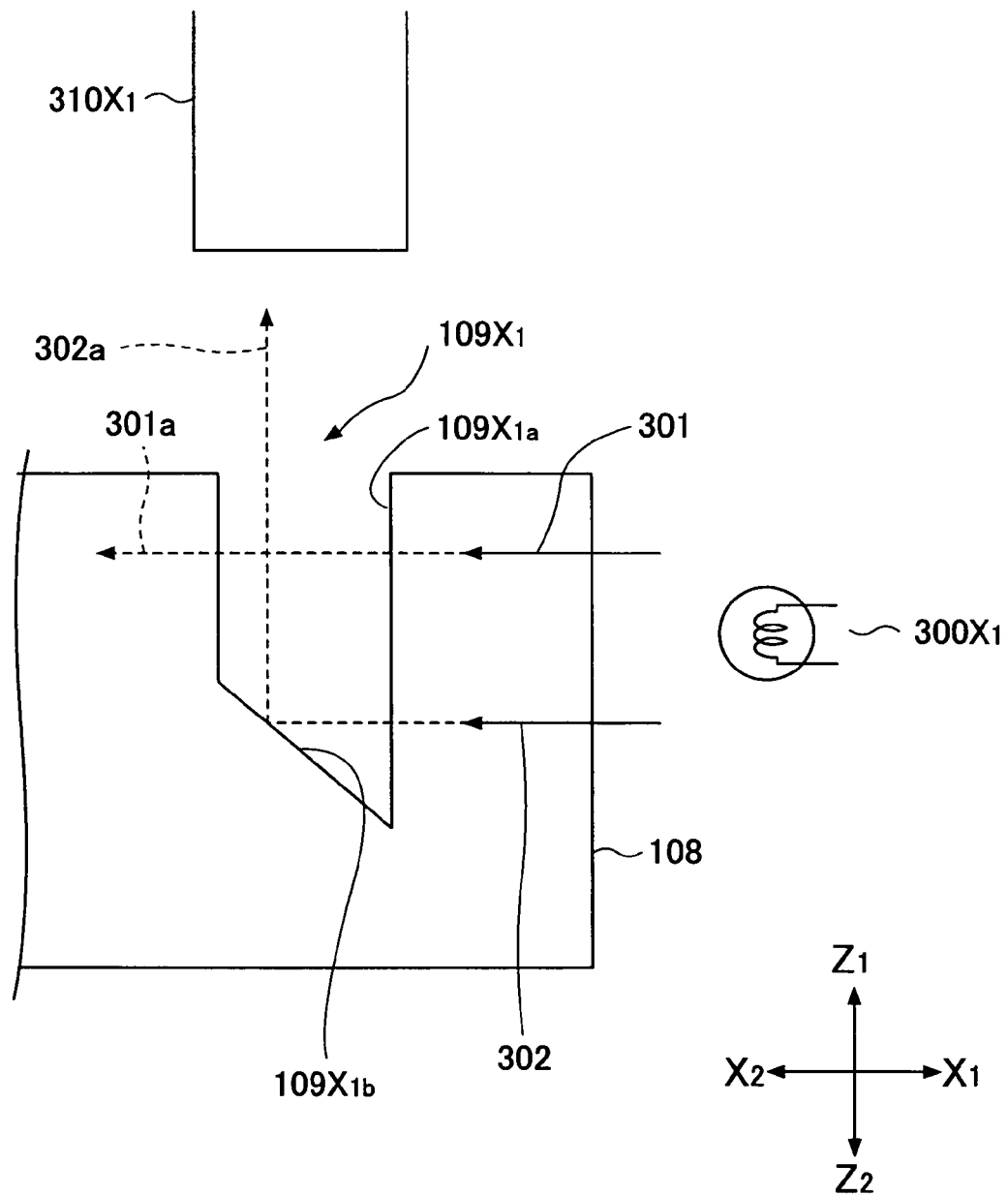
FIG. 19 is an enlarged view illustrating an alignment mark of a 3D optical path component.

As shown in FIG. 19 in more detail, the first alignment mark 109X1 is a hole 109X1a with an inclined bottom face 109X1b. The first alignment mark 109X1 is formed during molding of the 3D optical path component 90D, and does not need to be colored after the molding process.

The first alignment mark 109X1 can be recognized with use of a light source 300X1 and a CCD camera 310X1 disposed at the lateral side and the upper side of the first alignment mark 109X1, respectively. More specifically, light beams 301 and 302 from the light source X1 pass through the extended section 108. Then, the light beam 301 crosses the hole 109X1a and proceeds as indicated by an arrow 301a. On the other hand, the light beam 302 enters the hole 109X1a and is reflected by the inclined bottom face 109X1b. The reflected light beam 302 proceeds in the Z1 direction as indicated by an arrow 302a and is made incident on the CCD camera 310X1. As the inclined bottom face 109X1b appears bright in an image captured by the CCD camera 310X1, the first alignment mark 109X1 can be recognized.

With reference to FIG. 21, the second alignment mark 109X2 has a configuration similar to the first alignment mark 109X1, and is recognized with use of a light source 300X2 and a CCD camera 310X2 disposed at the lateral side and the upper side of the second alignment mark 109X2, respectively.

Figure 20A:
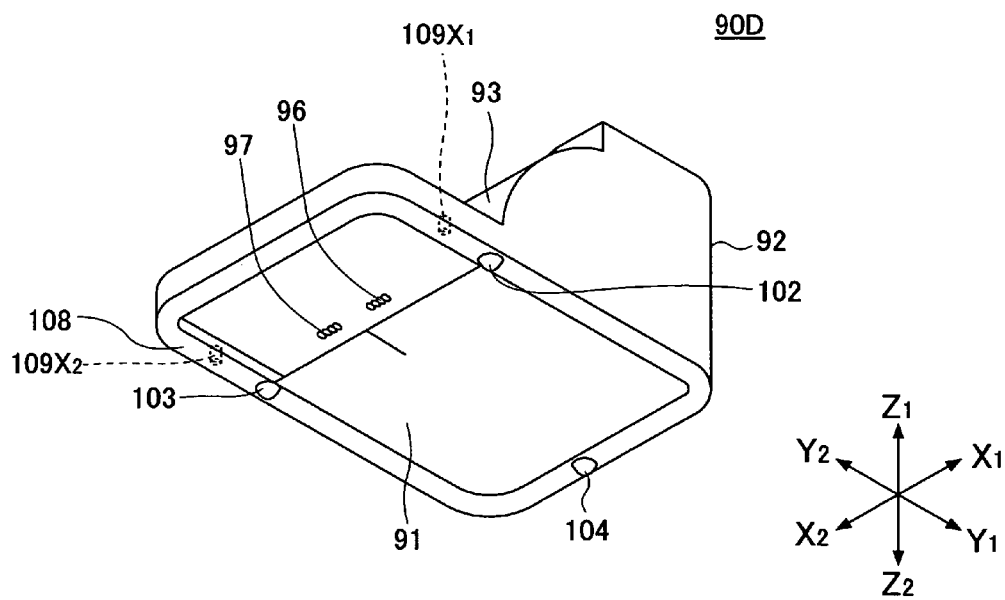
FIG. 20A is a perspective view illustrating a 3D optical path component.
Figure 20B:
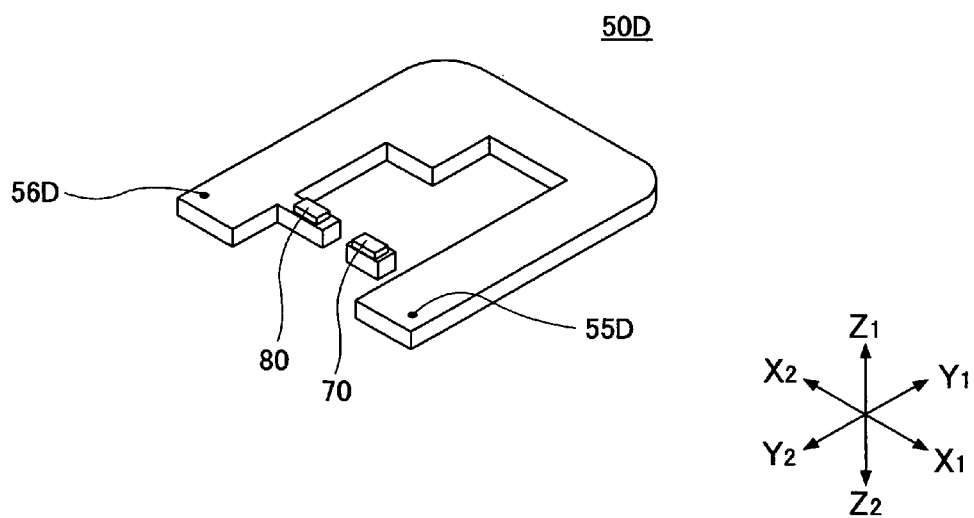
FIG. 20B is a perspective view illustrating a positioning plate.

Referring to FIGS. 18A and 20B, first and second alignment marks 55D and 56D are formed on the positioning plate 50D. The positioning plate 50D is not provided with a window and positioning boss members. Since the 3D optical path component 90D is transparent, the CCD cameras 310X1 and 310X2 can recognize the first and second alignment marks 55D and 56D under the extended section 108 of the 3D optical path component 90D even when the 3D optical path component 90D is disposed on the positioning plate 50D.

The first and second alignment marks 55D and 56D are formed at the positions corresponding to the first and second alignment marks 109X1 and 109X2. In other words, the first and second alignment marks 55D and 56D are arranged such that a first lens array 96 and second lens array 97 (see FIG. 20A) face a light receiving element 70 and a light emitting element 80, respectively, when the 3D optical path component 90D is mounted on the positioning plate 50D with the first and second alignment marks 55D and 56D placed over the first and second alignment marks 109X1 and 109X2, respectively.

Referring to FIG. 21, the positioning plate 50D is fixed to a printed circuit board 30B. The 3D optical path component 90D is adjusted to a position such that the first alignment mark 109X1 is placed over the first alignment mark 55D and the second alignment mark 109X2 is placed over the second alignment mark 56D while monitoring the first alignment mark 109X1 and the first alignment mark 55D with the CCD camera 310X1 and the second alignment mark 109X2 and the second alignment mark 56D with the CCD camera 310X2.

The first and second alignment marks 109X1 and 109X2 are formed at exact positions by molding at the same time of molding the 3D optical path component 90D. Therefore, the 3D optical path component 90D is accurately positioned on the positioning plate 50D, so that the first lens array 96 and the second lens array 97 accurately face the light receiving element 70 and the light emitting element 80, respectively.

The present application is based on Japanese Priority Application No. 2005-092974 filed on Mar. 28, 2005, and Japanese Priority Application No. 2005-238513 filed on Aug. 19, 2005, with the Japanese Patent Office, the entire contents of which are hereby incorporated by reference.

What is claimed is:

1. A connector comprising:
   a housing;
   a module assembly disposed inside the housing, including
      an electric connector unit to be connected to a counterpart device,
      a semiconductor element,
      a light receiving element,
      a light emitting element,
   a positioning plate in which a positioning hole is formed, and on an upper face of which a light receiving element mount section and a light emitting element mount section where the light receiving element and the light emitting element are mounted, respectively, are formed,
   a three-dimensional optical path component mounted on the positioning plate, including an optical path, and a positioning pin and a projection on a bottom face of the three-dimensional optical path component on which a lens section is formed, the projection being spaced apart from the lens section, and
   a printed circuit board on which the electric connecter unit, the semiconductor element, and the positioning plate are mounted; and
   an optical fiber cable extending from a rear side of the housing;
   wherein the three-dimensional optical path component is positioned such that the positioning pin of the three-dimensional optical path component is fitted in the positioning hole formed in the positioning plate and the projection of the three-dimensional optical path component abuts the upper face of the positioning plate.

2. A connector comprising:
   a housing;
   a module assembly disposed inside the housing, including
      an electric connector unit to be connected to a counterpart device,
      a semiconductor element,
      a light receiving element,
      a light emitting element,
   a positioning plate in which a positioning hole is formed, and on an upper face of which a light receiving element mount section and a light emitting element mount section where the light receiving element and the light emitting element are mounted, respectively, are formed,
   a three-dimensional optical path component mounted on the positioning plate, including an optical path, and a positioning pin and a projection on a bottom face of the three-dimensional optical oath component on which a lens section is formed, and
   a printed circuit board on which the electric connecter unit, the semiconductor element, and the positioning plate are mounted; and
   an optical fiber cable extending from a rear side of the housing, wherein:
      the three-dimensional optical path component is positioned such that the positioning pin of the three-dimensional optical path component is fitted in the positioning hole formed in the positioning plate and the projection of the three-dimensional optical path component abuts the upper face of the positioning plate,
      an alignment mark is formed on the positioning plate,
      the positioning hole is positioned with reference to the alignment mark, and the light receiving element and the light emitting element are positioned with reference to the alignment mark.

3. A connector, comprising:

a housing;

a module assembly disposed inside the housing, including:
an electric connector unit to be connected to a counterpart device,
a semiconductor element,
a light receiving element,
a light emitting element, a positioning plate in which a positioning hole is formed and on an upper face of which a light receiving element mount section and a light emitting element mount section where the light receiving element and the light emitting element are mounted, respectively, are formed, a three-dimensional optical path component mounted on the positioning plate, including an optical path, and a positioning pin and a projection on a bottom face of the three-dimensional optical path component on which a lens section is formed, and a printed circuit board on which the electric connecter unit, the semiconductor element, and the positioning plate are mounted; and an optical fiber cable extending from a rear side of the housing, wherein:
the three-dimensional optical path component is positioned such that the positioning pin of the three-dimensional optical path component is fitted in the positioning hole formed in the positioning plate and the projection of the three-dimensional optical path component abuts the upper face of the positioning plate,
the positioning plate includes a frame having a rectangular shape, a bridge extending across the frame, and a window defined by the frame and the bridge, and
the semiconductor element is arranged within the window.

4. A connector, comprising:

a housing;

a module assembly disposed inside the housing, including
an electric connector unit to be connected to a counterpart device,
a semiconductor element,
a light receiving element,
a light emitting element, a positioning plate in which a positioning hole is formed, and on an upper face of which a light receiving element mount section and a light emitting element mount section where the light receiving element and the light emitting element are mounted, respectively, are formed, a three-dimensional optical path component mounted on the positioning plate, including an optical path, and a positioning pin and a projection on a bottom face of the three-dimensional optical path component on which a lens section is formed, and a printed circuit board on which the electric connecter unit, the semiconductor element, and the positioning plate are mounted; and an optical fiber cable extending from a rear side of the housing, wherein:
the three-dimensional optical path component is positioned such that the positioning pin of the three-dimensional optical path component is fitted in the positioning hole formed in the positioning plate and the projection of the three-dimensional optical path component abuts the upper face of the positioning plate, wherein:

the optical fiber cable includes an optical fiber core, and a cladding surrounding the optical fiber core;

an optical connector is connected to an end of the optical fiber cable and to the three-dimensional optical path component inside the housing;

a lock structure is disposed in the vicinity of the optical connector and fitted in a recess formed inside the housing, the lock structure including a first caulking member including a center hole through which the optical fiber cable extends and an annular section surrounding the center hole, and a second caulking member to be loosely fitted on the annular section of the first caulking member; and the cladding of the optical fiber cable extending out of the center hole of the first caulking member is divided longitudinally into a plurality of divided pieces and radially opened such that ends of the radially opened divided pieces are interposed and held between the annular section of the first caulking and the second caulking member.

5. A mount structure comprising:

a semiconductor element;

a light receiving element;

a light emitting element;

a positioning plate in which a positioning hole is formed, and on an upper face of which a light receiving element mount section and a light emitting element mount section where the light receiving element and the light emitting element are mounted, respectively, are formed;

a three-dimensional optical path component mounted on the positioning plate, including an optical path, and a positioning pin and a projection on a bottom face of the three-dimensional optical path component on which a lens section is formed, the projection being spaced apart from the lens section; and a printed circuit board on which the semiconductor element and the positioning plate are mounted, wherein:
the three-dimensional optical path component is positioned such that the positioning pin of the three-dimensional optical path component is fitted in the positioning hole and the projection of the three-dimensional optical path component abuts the upper face of the positioning plate.

6. A mount structure, comprising:

a semiconductor element;

a light receiving element;

a light emitting element;

a positioning plate in which a positioning hole is formed and on an upper face of which a light receiving element mount section and a light emitting element mount section where the light receiving element and the light emitting element are mounted, respectively, are formed;

a three-dimensional optical path component mounted on the positioning plate, including an optical path, and a positioning pin and a projection on a bottom face of the three-dimensional optical path component on which a lens section is formed; and a printed circuit board on which the semiconductor element and the positioning plate are mounted, wherein:
the three-dimensional optical path component is positioned such that the positioning pin of the three-dimensional optical path component is fitted in the positioning hole and the projection of the three-dimensional optical path component abuts the upper face of the positioning plate,
an alignment mark is formed on the positioning plate, the positioning hole is positioned with reference to the alignment mark, and the light receiving element and the light emitting element are positioned with reference to the alignment mark.

7. A mount structure, comprising:
a semiconductor element;
a light receiving element;
a light emitting element;
a positioning plate in which a positioning hole is formed and on an upper face of which a light receiving element mount section and a light emitting element mount section where the light receiving element and the light emitting element are mounted, respectively, are formed;
a three-dimensional optical path component mounted on the positioning plate, including an optical path, and a positioning pin and a projection on a bottom face of the three-dimensional optical path component on which a lens section is formed; and
a printed circuit board on which the semiconductor element and the positioning plate are mounted, wherein:
the three-dimensional optical path component is positioned such that the positioning pin of the three-dimensional optical path component is fitted in the positioning hole and the projection of the three-dimensional optical path component abuts the upper face of the positioning plate,
the positioning plate includes a frame having a rectangular shape, a bridge extending across the frame, on which bridge the light emitting element mount section and the light emitting element mount section are formed, and a window defined by the frame and the bridge, and
the semiconductor element is arranged within the window.

8. A connector comprising:
a housing;
a module assembly disposed inside the housing, including
an electric connector unit to be connected to a counterpart device,
a semiconductor element,
a light receiving element,
a light emitting element,
a positioning plate in which a positioning hole is formed, and on an upper face of which a light receiving element mount section and a light emitting element mount section where the light receiving element and the light emitting element are mounted, respectively, are formed,
a three-dimensional optical path component mounted on the positioning plate, including an optical path, and a positioning pin and a projection on a bottom face of the three-dimensional optical path component on which a lens section is formed, and
a printed circuit board on which the electric connecter unit, the semiconductor element, and the positioning plate are mounted; and
an optical fiber cable extending from a rear side of the housing, wherein:
the three-dimensional optical path component is positioned such that the positioning pin of the three-dimensional optical path component is fitted in the positioning hole formed in the positioning plate and the projection of the three-dimensional optical path component abuts the upper face of the positioning plate, and the positioning pin of the three-dimensional optical path component is a metal positioning boss member fixed by insert molding.

9. A connector comprising:
a housing;
a module assembly disposed inside the housing, including
an electric connector unit to be connected to a counterpart device,
a semiconductor element,
a light receiving element,
a light emitting element,
a positioning plate on an upper face of which a light receiving element mount section and a light emitting element mount section where the light receiving element and the light emitting element are mounted, respectively, are formed, including a positioning boss member made of metal and fixed by insert molding,
a three-dimensional optical path component mounted on the positioning plate, including an optical path, and a positioning hole and a projection on a bottom face of the three-dimensional optical path component on which a lens section is formed, and
a printed circuit board on which the electric connecter unit, the semiconductor element, and the positioning plate are mounted; and
an optical fiber cable extending from a rear side of the housing;
wherein the three-dimensional optical path component is positioned such that the positioning boss member of the positioning plate is fitted in the positioning hole of the three-dimensional optical path component and the projection of the three-dimensional optical path component abuts the upper face of the positioning plate.

10. A connector comprising:
a housing;
a module assembly disposed inside the housing, including
an electric connector unit to be connected to a counterpart device,
a semiconductor element,
a light receiving element,
a light emitting element,
a positioning plate on an upper face of which a light receiving element mount section and a light emitting element mount section where the light receiving element and the light emitting element are mounted, respectively, are formed, including an alignment mark,
a three-dimensional optical path component that is a transparent synthetic resin molded product and is mounted on the positioning plate, including an optical path, a projection on a bottom face of the three-dimensional optical path component on which a lens section is formed, and a hole alignment mark including a hole formed during molding, and
a printed circuit board on which the electric connecter unit, the semiconductor element, and the positioning plate are mounted; and
an optical fiber cable extending from a rear side of the housing;
wherein the three-dimensional optical path component is positioned such that the hole alignment mark of the three-dimensional optical path component is placed over the alignment mark of the positioning plate and the projection of the three-dimensional optical path component abuts the upper face of the positioning plate.

* * * * *

UNITED STATES PATENT AND TRADEMARK OFFICE
CERTIFICATE OF CORRECTION

| | |
|---|---|
| PATENT NO. | : 7,441,965 B2 |
| APPLICATION NO. | : 11/299626 |
| DATED | : October 28, 2008 |
| INVENTOR(S) | : Tasuhiko Furuno et al. |

It is certified that error appears in the above-identified patent and that said Letters Patent is hereby corrected as shown below:

Column 10, Line 52, change "oath" to --path--.

Column 13, Line 10, change "formed" to --formed,--.

Signed and Sealed this

Tenth Day of February, 2009

JOHN DOLL
*Acting Director of the United States Patent and Trademark Office*